US010333900B2

(12) United States Patent
Chang et al.

(10) Patent No.: US 10,333,900 B2
(45) Date of Patent: Jun. 25, 2019

(54) ENVELOPING FOR MULTILINK COMMUNICATIONS

(71) Applicants: Donald C. D. Chang, Thousand Oaks, CA (US); Juo-Yu Lee, Camarillo, CA (US); Steve K. Chen, Pacific Palisades, CA (US)

(72) Inventors: Donald C. D. Chang, Thousand Oaks, CA (US); Juo-Yu Lee, Camarillo, CA (US); Steve K. Chen, Pacific Palisades, CA (US)

(73) Assignee: SPATIAL DIGITAL SYSTEMS, INC., Agoura Hills, CA (US)

( * ) Notice: Subject to any disclaimer, the term of this patent is extended or adjusted under 35 U.S.C. 154(b) by 128 days.

(21) Appl. No.: 14/993,397

(22) Filed: Jan. 12, 2016

(65) Prior Publication Data
US 2017/0201339 A1 Jul. 13, 2017

(51) Int. Cl.
*H04J 3/02* (2006.01)
*H04L 29/06* (2006.01)
(Continued)

(52) U.S. Cl.
CPC .......... *H04L 63/04* (2013.01); *G06F 21/6245* (2013.01); *H04L 27/00* (2013.01); *H04L 65/607* (2013.01)

(58) Field of Classification Search
CPC ... A61B 6/4007; A61B 6/4014; A61B 6/4435; A61B 6/482
See application file for complete search history.

(56) References Cited

U.S. PATENT DOCUMENTS 5,701,391 A * 12/1997 Pan ..................... G10L 19/0204
704/201
8,111,646 B1 2/2012 Chang
(Continued)

*Primary Examiner* — Mansour Oveissi
(74) *Attorney, Agent, or Firm* — Phuong-Quan Hoang

(57) ABSTRACT

Enveloping techniques using incoherent wavefront multiplexing (WF muxing or K-muxing) will enhance privacy protection on data communications. The disclosure relates to methods and architectures of packing or enveloping data using WF muxing, or K-muxing, for information transport via multiple communication links such as concurrently via multiple satellites, airborne platforms, wireless terrestrial links, and/or other wireless links. The multi-link communications may include the use of cloud transport of multiple WF-muxed data packages. It is focused to appearance of a digital envelop and reliability of enclosed data. The K-muxing on information digital streams before modulation in a transmitter shall provide enhanced data privacy and better availability. The WF multiplexed (WF muxed or K-muxed) information data streams will be individually and concurrently sent to the multiple links accordingly for data transport. The corresponding WF demuxing or K-demuxing will be performed on received K-muxed information digital stream after demodulation in a receiver. The terms of information data or digital information streams are used to differentiate them from those of data signals or digital signal streams. In a transmission, information data usually will be modulated by modulators and converted into data signals before being transmitted. Similarly in a receiver, a received digital signal stream is demodulated by a demodulator and become a digital information stream. The incoherent K-muxing and K-demuxing will be used for processing information data or digital information streams for the benefits of enhanced privacy and better availability. On the other hand, the coherent K-muxing and K-demuxing for processing data signals or digital signal streams will be used (Continued)

for power combining and/or dynamic resource allocations for communications channels.

20 Claims, 19 Drawing Sheets

(51) Int. Cl.
*G06F 21/62* (2013.01)
*H04L 27/00* (2006.01)

(56) References Cited

U.S. PATENT DOCUMENTS

| | | |
|---|---|---|
| 8,538,326 B2 | 9/2013 | Chang |
| 8,547,897 B2 | 10/2013 | Chang |
| 8,953,728 B2 | 2/2015 | Chang |
| 2003/0056108 A1* | 3/2003 | Mont .................. G06F 21/6209 713/193 |
| 2003/0117647 A1* | 6/2003 | Kaku .................. H04L 27/2601 358/1.15 |
| 2011/0197740 A1 | 8/2011 | Chang |
| 2011/0231645 A1* | 9/2011 | Thomas .................. H04L 9/321 713/150 |
| 2013/0333544 A1 | 12/2013 | Chang |
| 2014/0081989 A1 | 3/2014 | Chang |
| 2014/0161018 A1 | 6/2014 | Chang |
| 2014/0219124 A1 | 8/2014 | Chang |
| 2015/0032706 A1 | 1/2015 | Chang |
| 2015/0040184 A1 | 2/2015 | Chang |
| 2015/0248431 A1 | 9/2015 | Lee |

* cited by examiner

ENVELOPING FOR MULTILINK COMMUNICATIONS

RELATED APPLICATIONS

This application is related to incoherent wavefront multiplexing (WF muxing) and incoherent wavefront demultiplexing (WF demuxing) techniques in the following references:
1. U.S. Pat. App. Pub. No. 20150032706 A1; "Enveloping for Cloud Computing via Wavefront Muxing," pub. on Jan. 29, 2015.
2. U.S. Pat. App. Pub. No. 20150040184 A1, "Digital Enveloping for Digital Right Management and Re-broadcasting," pub. on Feb. 5, 2015.
3. U.S. Pat. App. Pub. No. 20110197740; "Novel Karaoke and Multi-Channel Data Recording/Transmission Techniques via Wavefront Multiplexing and Demultiplexing," pub. on Aug. 18, 2011.
4. U.S. Pat. App. Pub. No. 20130333544; "Novel Karaoke and Multi-Channel Data Recording/Transmission Techniques via Wavefront Multiplexing and Demultiplexing," pub. on Dec. 19, 2013.
5. U.S. Pat. App. Pub. No. US 20140081989; "WF Muxing and Demuxing for Cloud Data Storage and Transport," pub. on Mar. 20, 2014.
6. U.S. Pat. Appl. Pub. No. 20150248431; "Survivable Cloud Data Storage and Transport," published on Sep. 3, 2015.

All of the above are incorporated herein by reference in their entireties.

This application is also related to satellite communications using multiple transponders, deployed UAVs, or others via coherent wavefront multiplexing (WF muxing) and wavefront demultiplexing (WF demuxing) techniques in the following references
1. U.S. Pat. No. 8,111,646 B1; "Communication system for dynamically combining power from a plurality of propagation channels in order to improve power levels of transmitted signals without affecting receiver and propagation segments," issued on Feb. 7, 2012.
2. U.S. Pat. No. 8,547,897 B2; "Coherent power combining for signals through multiple satellite communications channels," issued on Oct. 1, 2013.
3. U.S. Pat. No. 8,538,326 B2; "Accessing LP transponders with CP terminals via wavefront multiplexing techniques," issued on Sep. 17, 2013.
4. U.S. Pat. App. Pub. No. 20140161018 A1; "Multi-user MIMO via frequency re-use in smart antenna," pub. on Jun. 12, 2014.
5. U.S. Pat. App. Pub. No. 2014/0219124, "Multi-user MIMO via active scattering platforms," pub. on Aug. 7, 2014.
6. U.S. Pat. No. 8,953,728 B2, "Systems for processing data streams," issued on Feb. 10, 2015.

All of the above are incorporated herein by reference in their entireties.

BACKGROUND

Field of the Disclosure

There are needs for better privacy protection on data transport. Enveloping techniques using incoherent WF muxing will enhance privacy protection on data communications. The disclosure relates to methods and architectures of packing or enveloping data using Wavefront multiplexing (WF muxing) for transport via multiple communication links. It is focused to appearance of data package/envelop and reliability of enclosed data. The WF muxing implemented on information digital stream before modulation in radiation chains in a transmitter shall provide enhanced data privacy and better availability in multiple-link communications between an information source and an information destination. The WF multiplexed (WF muxed) information data streams in a source will be individually and concurrently sent via the multiple links accordingly for information data transport to a destination. The related WF demuxing will be performed on information digital streams after demodulation in receiving chains in a corresponding receiver.

We use the terms of information data or digital information streams to differentiate the data signals or digital signal streams. In a transmission chain, information data will usually be modulated by modulators into data signals before transmission. Similarly in a receiving chain, a received digital signal stream will be demodulated by demodulators and converted into a digital information stream. The incoherent WF muxing/demuxing will be used for processing information data or digital information streams for the benefits of enhanced privacy and better availability. On the other hand, the coherent WF muxing/demuxing for processing data signals or digital signal streams will be used for power combining and/or dynamic resource allocations for communications channels.

This invention application addresses enhanced privacy, and better reliability (or availability) of data transports in communications with multi-links; such as concurrently via multiple satellites, airborne platforms, wireless terrestrial links, and/or other wireless links. The multi-link communications may include the use of cloud transport of multiple WF-muxed data packages.

Many of the data may be image or audio related. Since multiple data sets to be transported will be preprocessed on client sides, each of the transported data is a multiplexed (muxed) data set individually which is unintelligible by itself. Therefore, the proposed approaches shall remove the concerns on information leaks from individual communications links, or those on the rights or ownerships of stored/transported data through individual communications links. Digital images will be used to exemplify the digital enveloping/de-enveloping techniques in this patent application. Other types of digital streams may be easily incorporated as the digital envelops for the proposed enveloping techniques.

Embodiments of "writing" and "reading" processes will be summarized and presented concisely. "Writing" features a process on multiple original images concurrently via WF muxing transformations, generating WF muxed data before transmitting. A "reading" process corresponds to a WF demuxing transformation on WF muxed data stored on cloud, reconstituting original data sets. The enveloping is a subset of "writing" procedures under constraints that enveloped messages, or products of the writing procedures, shall preserve some desired features in digital appearance, and the de-enveloping is a subset of reading procedures to reconstitute embedded mails from the enveloped messages.

SUMMARY

Wavefront multiplexing/demultiplexing (WF muxing/demuxing) process features an algorithm invented by Spatial Digital Systems (SDS) for satellite communications where transmissions demand a high degree of power combining, security, reliability, and optimization. WF muxing/demuxing, embodying an architecture that utilizes multi-dimensional transmissions, has found applications in fields beyond the satellite communication domain. One such application is data transport/storage on cloud where privacy, data integrity, and redundancy are important. Enveloping and de-enveloping on digital data may be used for both data transport and data storage. We will use data transport via wireless links to exemplify the concept of enveloping and de-enveloping for digital information data.

Privacy are important concerns on data transport, especially in wireless communications including those via transponding satellites, air platforms and unmanned aerial vehicles (UAVs). Wavefront multiplexing/demultiplexing (WF muxing/demuxing) process embodies an architecture that utilizes multi-dimensional waveforms in data transport over multiple links. Multiple data sets are preprocessed by WF muxing before being transported. WF muxed data is aggregated data from multiple input data sets that have been "customized and processed" and disassembled into any scalable number of sets of processed data in output, with each set being transported via a propagation link or channel. The original data is reassembled via WF demuxing after retrieving a lesser but scalable number of WF muxed data sets from the multiple links. In short, the WF muxed data transport solution enhances data privacy and data availability via redundancy by, respectively, creating a new dimension to existing security or data privacy methods and significantly reducing the transported data packages needed for better availability via data redundancy formats. In addition, WF muxing/demuxing methods enable a monitoring capability on the integrity of transported data.

K-space is a well understood term in solid state physics and imaging processing. The k-space can refer to:
a. Another name for the frequency domain but referring to a spatial rather than temporal frequency
b. Reciprocal space for the Fourier transform of a spatial function
c. Momentum space for the vector space of possible values of momentum for a particle
d. According to Wikipedia (September 2015), the k-space in magnetic resonance imaging (MRI)
   i. a formalism of k-space widely used in magnetic resonance imaging (MRI) introduced in 1979 by Likes and in 1983 by Ljunggren and Twieg.
   ii. In MRI physics, k-space is the 2D or 3D Fourier transform of the MR image measured.

We shall introduce the terms K-mux, Kmux, or KMx for representing the Wavefront multiplex; and K-muxing, Kmuxing, or KMxing for the Wavefront multiplexing. We may use "K-Muxing in satellite communications" for "WF-Muxing in satellite communications", "K-muxer" for "WF muxer", and so on. In Electromagnetic (EM) theory, the letter K is often used to represent a directional vector and is a wave number in a propagation direction. The term ($\omega t - \underline{K} \cdot \underline{R}$) has been used extensively for propagation phase. $\underline{K}$ represents a directional (moving) surface and $\underline{R}$ a directional propagation displacement. Both are vectors. Therefore a vector K represents a "wavefront" mathematically. We will be using k-space as wavefront domain or wavefront space.

This invention of "enveloping" is about to send not all but a portion of K-muxed data streams through multiple links to destinations. Enveloped data streams are data sub-files or multiple files K-muxed with a known data file as an envelope which may be a sender's personal picture indicating who is sending the enveloped (embedded) data streams. Different envelops may feature various pictures of sender's indicating, for instance, sender's mood while sending the enveloped data. The digital envelopes may be an old digital video clip for delivering new digital data streams for communications among family members only. All family members shall have access to the original old video clip.

WF muxing/demuxing for enveloping are configured to use additional known digital data streams for probing, authentications and identifications. A method for enveloping and then sending data through multiple links comprises: (1) transforming multiple first data sets via K-muxing into multiple enveloped second data sets at a transmitting side, wherein one of said enveloped second data sets comprises a weighted sum of said first data sets at said transmitting side; (2) sending said enveloped second data sets via multiple links to a destination, (3) receiving the enveloped second data sets in the destinations and (4) reconstituting the original first data sets via a corresponding K-demuxing operation.

A data processing method comprises: transforming multiple first data sets and a known data set into multiple enveloped second data sets at a transmitting side, wherein one of said enveloped second data sets comprises a weighted sum of said first data sets; and recovering a third data sets from some of said enveloped second data sets and said known data set at a receiving side, wherein one of said third data sets comprises a weighted sum of said some of said enveloped second data sets.

BRIEF DESCRIPTION OF THE DRAWINGS

The drawings disclose illustrative embodiments of the present disclosure. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure.

DETAILED DESCRIPTION OF THE INVENTION

The present invention relates to distributed transport paths with built-in redundancy via an M-to-M wavefront multiplexing (K-muxing) techniques, where $M \geq 2$ and must be an integer. The M inputs to the K-muxing comprising N streams of information data with additional M-N known data files, where $N \geq 1$ and is an integer. The M independent input data streams are transformed and concurrently converted into K-muxed domain with M output wavefront components (wfcs). Only M' of the M outputs will be used for data transport and/or data storage on cloud, where $M-N \leq M' \leq M$, $M' \geq 1$ and is an integer.

Furthermore, any one of the known data files may be chosen to serve as a digital transporting envelop and will be processed accordingly in an enveloping process as a part of the M-to-M K-muxing.

Multiple inputs to an M-to-M K-muxing processor are properly "emphasized" or "weighted" so that at least one of the M outputs will become a "carrier" or a digital enveloped data stream for transporting embedded message. The selected "carrier" shall appear substantially identical to the appearance of the selected digital envelop to human sensors. The identical appearance comprises unique and easily distinguishable features from other digital data files. These features may be visual pictures, videos, audio music, word files, or multimedia files At least one of the enveloped data streams will be sent to a destination via cloud. An enveloped data stream may appear as a digital picture, a video clip, a music clip, an audio recording, or a digital cartoon while being transported through wireless links. Just as functions of regular envelops, these digital envelops may convey context and authors of the embedded mail, a preview of intentions and moods of the author, and/or information of where the embedded mail was originated.

The digital envelop and the enveloped digital data stream shall have substantially identical features which are identifiable and distinguishable by human sensors; hearing, visually or both.

At destination, a desired receiver shall reconstitute the embedded information data by a wavefront demultiplexing (K-demuxing) as the post processing while accessing the known file of the original digital envelop.

Figure 1:
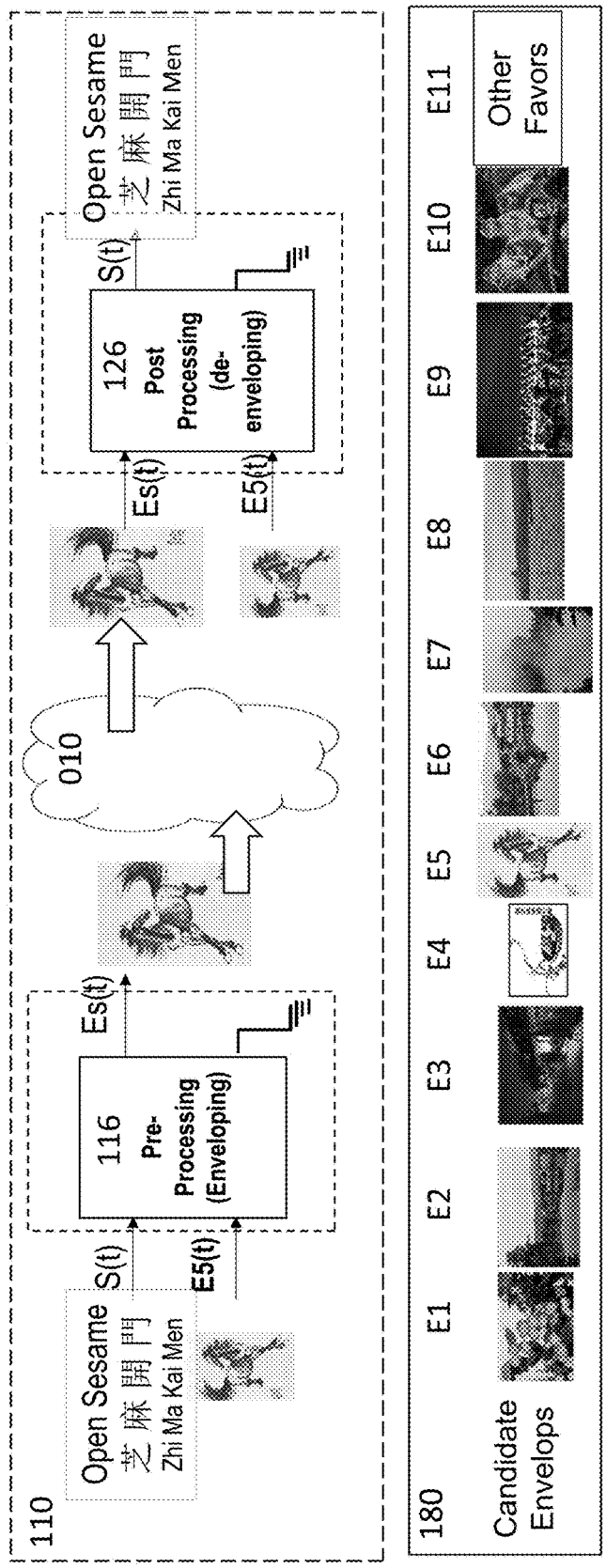
FIG. 1, a replicate of FIG. 1 in US Patent Application Publication No. US 2015/0032706 A1, depicts a block diagram on "sealing" a digital envelope for an embedded digital file via a 2-to-2 WF muxing processor by a sender at a source, sending only one of the two outputs as the digitally enveloped data to a destination via cloud, and "de-enveloping" the digital envelop and recovering the embedded data in accordance to some embodiments of this invention. The digital envelope is chosen by the sender from one of the known candidate digital envelopes to both the sender at the source and the receiver at the destination. The sealing and opening (or un-sealing) process for an envelope are also referred as enveloping and de-enveloping, respectively.
Figure 1A:
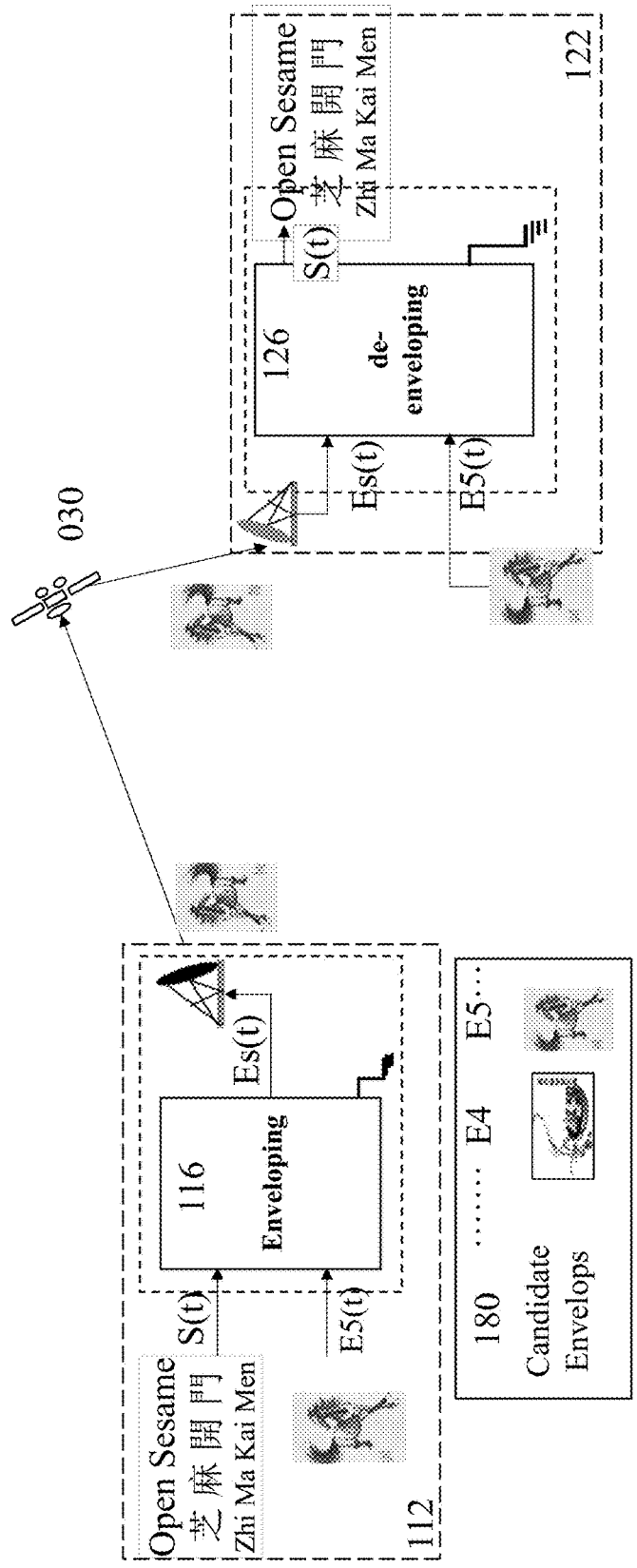
FIG. 1A depicts the same digital enveloping and de-enveloping processes, except the communications between the source and the destination are through a satellite link according to embodiments of this invention.

The present invention discloses operation concepts, methods and implementations of enveloping/de-enveloping via wavefront multiplexing for wireless transport as depicted in FIG. 1A. Similar techniques can be applied to video streaming, secured data storage services, secured file transfers, and other applications via wireless connectivity and/or Internet Clouds. The embodiments of present inventions comprise three important segments including (1) the pre-processing for enclosing a mail in a selected envelope, i.e. the K-muxing, at a source; (2) transporting embedded mails via enveloped digital streams via wireless links and/or cloud, and (3) a post-processing of retrieval or de-enveloping, i.e. the K-demuxing, at a destination. We will depict both pre-processing and a post-processing as an example for illustrating the operation concepts.

In principle, the pre-processing and the post-processing are all performed in user segments and performed in equipment at the user end. For satellite communications, these enveloping/de-enveloping may also be performed in teleport facilities of an operator. The operator will aggregate the K-muxed data sets from distributed satellites covering a common service area.

FIG. 1 is a modified replicate of FIG. 1 in US Patent Application Publication No. US 2015/0032706 A1 and depicts an operation communications concept 110 between a sender at a source and a receiver at a destination. The modifications are on two indicators; "130" changed to "116" and "140" altered to "126".

The sender takes advantages of a 2-to-2 K-muxing processor for sealing or enveloping 116 a set of input data S(t) by a selected digital envelope E5(t). The input data is an English phrase "Open Sesame" and its Chinese translation in a word format written in 4 Chinese characters and associated pronunciation symbols. The chosen digital envelope is a digital picture of a famous painting of "a running horse" by a Chinese painter, Xu Beihong, in early 1900's. There are 11 digital envelopes in a candidate envelop folder 180 commonly known to a user community which both the sender and the receiver belong to. There are two outputs from the K-muxer; one is for the enveloped mail Es(t), and the other Ed(t) (not indicated) which is grounded. The Es(t) is a result of pixel-by-pixel processing from the two inputs data files; S(t) and E5(t). The K-muxing features a 2*2 Hadamard transform. S(t) and E5(t) will be "scaled" properly to enable Es(t) appearance substantially identical to that in E5(t); as discussed in the US patent application publication no. 2014/0081989A1 extensively. In this case, the running horse in Es(t) appears to be a flipped image of the same house in E5(t).

After the K-muxing, Es(t) is an enveloped data stream, and is the only file to be sent to a destination via IP networks 010. Es(t) features with a visual appearance nearly identical to the picture of the famous running horse in E5(t).

At the destination, a receive shall reconstitute the embedded message of "Open Sesame" written in Chinese by de-enveloping as post-processing 140 only when the digital picture of the original envelop is available to the receiver. The post processing for de-enveloping 126 is implemented to perform the 2*2 K-demuxing transform, reconstituting the embedded information data stream S(t). There is only one communication link sending and receiving Es(t) via cloud 010.

Embodiment 1

FIG. 1A, derived from FIG. 1, depicts a concept of communications via a transponding satellite between a sender at a source 112 and a receiver at a destination 122. There are three segments including (1) a pre-processor for enveloping 116 at a communications source or a source 112, (2) a communications channel including a communicate satellite 030, and (3) a post processing for de-enveloping 126 at a communications destination or a destination 122 downstream from the satellite 030. The information data S(t) and the digital envelop E5(t) are identical to those in FIG. 1.

There is only one communications link for sending Es(t) from the source 112 to the satellite 030 and one link from the satellite 030 to the destination 122 sending transponded Es(t) or re-generated Es(t). No sufficient information is transported at any time for un-intended users in these two communication links to recover the embedded information S(t).

Enveloping 116:

For enveloping 116 in a pre-processor in the communications source 112, a 2-to-2 K-muxing transform converts an input information data S(t) and a selected digital envelop stream E5(t) from a candidate envelop folder 180 to two output data streams, i.e. Es(t), and Ed(t), where:

$$Es(t)=S(t)+am*E5(t) \quad (1\text{-}1)$$

$$Ed(t)=-S(t)+am*E5(t), \quad (1\text{-}2)$$

where am>>1 is a magnification factor, and image dependent, usually set between 5 and 30. Ed(t) is grounded. Effectively, a 2-to-2 Hadamard matrix (HM) has been chosen for the transform of K-muxing. Equations (1-1) to (1-2) can be written in a matrix form as $$O=HM*I \quad (2)$$

where: $O=[O1,O2]^T=[Es(t),Ed(t)]^T \quad (2\text{-}1)$ $$HM = \begin{bmatrix} 1 & 1 \\ -1 & 1 \end{bmatrix} \quad (2\text{-}2)$$

$$I=[I1,I2]^T=[S(t),am*E5(t)]^T \quad (2\text{-}3)$$

The input ports of a K-muxing processor, or a K-muxer, are referred to as slices, and its output ports are wavefront components (wfc's). The two input data sets S1 and am*E5, are connected to the input ports, i.e. slice 1, and slice 2 of the K-muxer respectively. The 2 output data sets i.e. O1-O2, are connected to the output ports, i.e. wfc1-wfc2, of the K-muxer in the pre-processing respectively.

In general a 2-to-2 K-muxing processor features 2 orthogonal wavefront vectors or WFV's. Let us define a coefficient wjk of a WF transformation to be the coefficient at the $j^{th}$ row and $k^{th}$ column of the K-muxer 130. A WFV of the K-muxer in pre-processing 130 featuring a distribution among the 2 outputs, i.e. O1-O2 at the 2 WF component ports wfc1-wfc2, is defined as a 2-dimensional vector. They are mutually orthogonal. The two wavefront vectors (WFVs) of the K-muxer are:

$$WFV1=[w11,w21]^T=[1,-1]^T \quad (3.1)$$

$$WFV2=[w12,w22]^T=[1,1]^T \quad (3.2)$$

S(t), and E5(t) are "attached" to the 2 WFVs by respectively connected to the two input ports of the K-muxing device in the preprocessing. All components of the 2 orthogonal WFVs are related to input and output port numbers or (spatial) sequences, but are independent from the input and output data sets.

The arithmetic operations of "linear combinations" may operate on blocks of information data after all inputs are aligned as digital information streams sample-after-sample for various inputs. A "byte" of data may be "selected" as a sample and a block of X samples, i.e. A sample of 7 bytes of a digital data stream will be treated as a numerical number for calculations in K-muxing transforms. Two streams of 7-byte samples may be the respective inputs of the 2-to-2 WF muxer. A block size of samples of 8 bytes in this case, will be reserved for the results of arithmetic operations on a number of the digital streams to avoid issues of overflows and underflows at the two outputs of the K-muxing transforms. There shall be 12.5% in data size overhead of the 7 byte arithmetic operations, with respect to the results in 8 byte forms in the outputs. In different embodiments, we may choose blocks with a block length of 99 bytes for arithmetic operation, i.e. X=99, reducing the arithmetic operation overhead to 1%.

The 7 byte arithmetic operations shall also feature 14.28% or 1/7 in data size overhead with respect to the 7 byte inputs.

There are other choices in selecting data blocks for arithmetic operations of linear combinations or weighted sums in the K-muxing transformations. For imaging processing, a pixel by pixel as operation blocks may be more important preserving unique features for some applications, or a row or a column of pixels as a data block for efficient usage of transporting bandwidth.

In this example, only one (Es) of the two outputs (Es and Ed) is sent to the destination 122. The intended receiver must have "additional information" in order to reconstitute the embedded message or the mail; "Open Sesame" and its Chinese translation in a word format written in 4 Chinese Characters. The additional information is the original file of the selected digital envelop E5(t).

In general at least one of K-muxed output streams from higher order muxing or multilayer enveloping will be sent to the communication destination 120 via satellites 030. The embedded mail is in the enveloped digital data stream. The higher order muxing is usually referred to an N-to-N K-muxing with N in between 4 and 5000. The numbers of K-muxed streams to be sent to a destination shall be always smaller than a critical numbers of muxed data streams; Ncr.

For un-intended receivers, there are not enough information in the Ncr K-muxed data streams flowing through the satellite links to reconstitute the embedded information. Additional information known a priori is required for reconstituting enveloped (embedded) original data.

On the other hand in a different embodiment where both outputs (Es and ED) were delivered to a receiver, both the embedded mail S(t) and the selected original digital envelop E5 could all be reconstituted independently at the destination 122 without any additional a priori known information.

Communication Satellite 030:

Referring to FIG. 1A again, only one K-muxed file is sent from the source 112 to the destination 122 via the satellite 030. The original digital envelope file is known a priori to both the sender at a source 112 and receiver at the destination 122. Therefore the required channel bandwidth for Es(t) is about the same as that of the embedded message, S(t). The differentials in required bandwidths between that for Es(t) and that for S(t) are due to a pre-processing overhead.

De-Enveloping 126:

De-enveloping 126 in a post processor for data retrieval comprises a K-demuxing transform, converting the received K-muxed data into an output of embedded data file S(t). The original digital envelope file, E5(t), is also used as one input to the K-demuxing transform in the de-enveloping 126. The received K-muxed data is substantially equivalent to the corresponding output data set, Es(t), of the enveloping 116 in the source 110, if not contaminated, and is therefore represented by Es(t) or Es'(t). Similarly, the recovered embedded data file is substantially equivalent to the input data sets, S(t), and is therefore referred to as S(t) or S'(t).

According to equation (1-1); the recovered embedded data can be derived from the received K-muxed data Es(t) and the known digital envelope E5(t)

$$S(t)=Es(t)-am*E5(t) \quad (4)$$

where the factor "am" can be experimentally optimized or through a priori knowledge set. Therefore, the missing second output of the K-muxing can also be re-constructed in the destination according to Equation (1-2) and Equation (4)

$$Ed(t)=-Es(t)+2*am*E5(t), \quad (5)$$

A 2-to-2 Hadamard matrix with scaling factor of ½ may be chosen as the 2-to-2 K-demuxer. The matrix elements of 2-to-2 Hadamard matrix feature "1" or "−1" only. The relationship may be written in a matrix form as $$SM=HM*D \quad (6)$$

$$\text{where: } D=[D1,D2]^T=[Es(t),Ed(t)]^T \quad (6-1)$$

$$SM=[S(t),am\ E5(t)]^T \quad (6-2)$$

HM is a 2-to-2 Hadamard matrix in equation (2-2).

The input ports of a K-demuxing transform in de-enveloping 126 are referred to as wavefront components (wfcs), i.e. wfc1, and wfc2, and its output ports are slices, i.e. slice1, and slice2. In this example, the 2 input data sets, i.e. Es(t) and Ed(t), are connected to its input ports wfc1-wfc2 of the K-demuxing transform in the de-enveloping 140, respectively. The retrieved data set, S1, is from its first output ports. Normally the second output of the de-enveloping 126 will be "grounded" for most applications with customized receivers.

Other Embodiments Via FIG. 1A

In a different embodiment, the first output Es(t) from the enveloping 116 in the pre-processor at the source 112 as depicted is sent to the satellite 030, while the respective second output Ed(t) is no longer grounded but sent aperiodically via a second channel in the same satellite 030, through a second satellite (not shown), or a different channel such as cloud, to the destination 122 to reconstitute a copy of the original digital envelop at the destination 122. Based on Equations (1-1) and (1-2)

$$S(t)=(Es(t)+Ed(t))/2 \quad (7-1)$$

$$E5(t)=(Es(t)-Ed(t))/(2*am) \quad (7-2)$$

The reconstructed digital envelop, E5(t), may be utilized for comparison with the known on-filed digital envelope for the integrity of received data S(t). It is a good indication that the received embedded data has been compromised only if a set of comparison results showing the two digital envelopes are different.

In another embodiment, the respective second output Ed(t) from the enveloping 130 at the source is sent concurrently and continuously via a second channel in the same satellite 030 or through a different channel such as cloud, to reconstitute the embedded message S(t) and a copy of the original digital envelop E5(t) at the destination 122 according to equations (7-1) and (7-2). The reconstructed digital envelop, E5(t), will be stored on file for receiving embedded data in future. It is a good technique to deliver digital envelops to receivers in destinations.

Furthermore, when S(t) is another selected envelop, say E4(t), at the source 110, the transmissions of Es(t) and Ed(t) of equation (1-1) and (1-2) via two separated and independent channels shall provide transporting privacy of E4(t) from the source 112 to the destination 122. These two independent channels may even be in two different transponders of the same depicted satellite 030.

Embodiment 2

Figure 2:
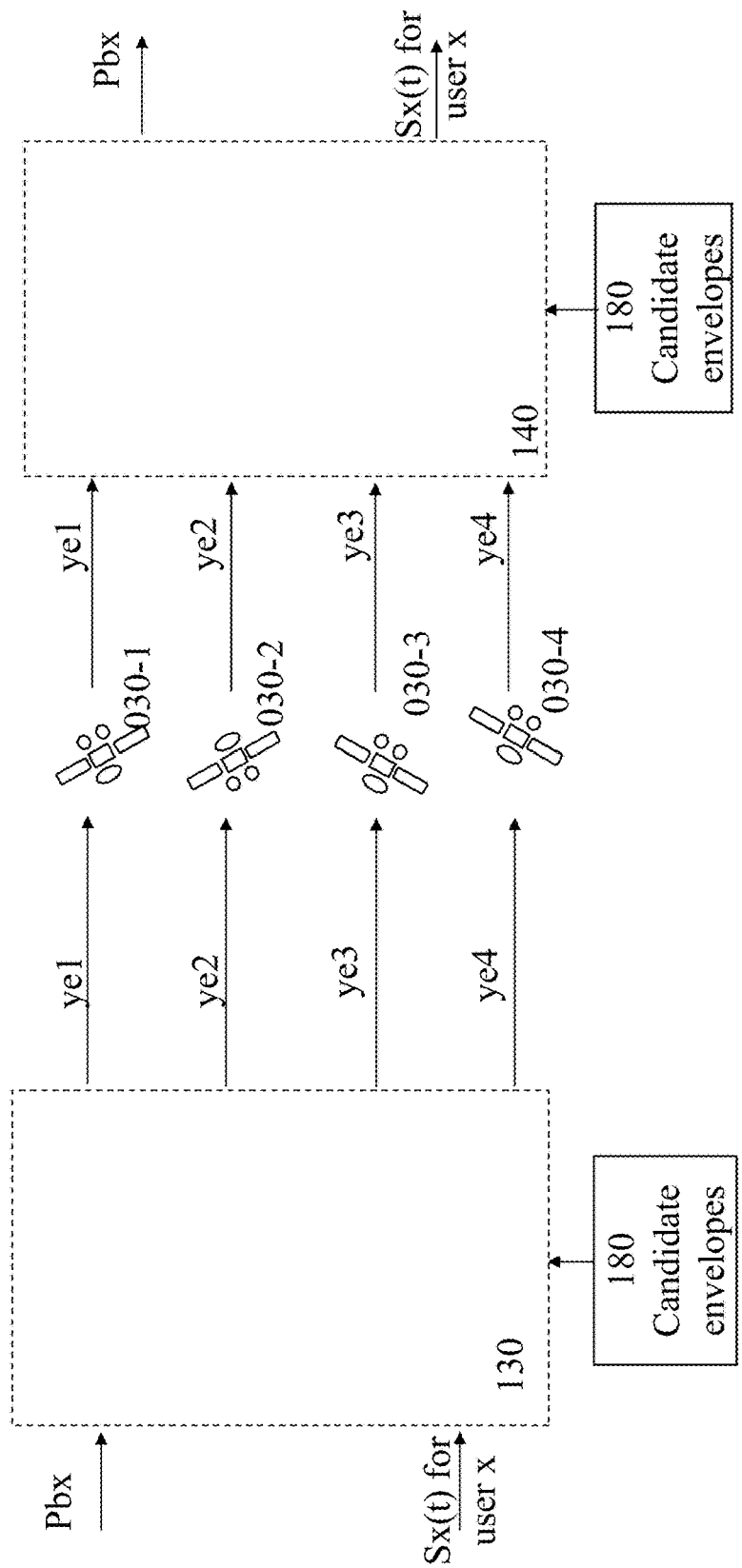
FIG. 2 depicts a block diagram on "sealing" digital envelopes for an embedded digital file via a K-muxing processor by a sender at a source, sending all 4 outputs as the digitally enveloped data to a destination via multiple satellites, and "de-enveloping" the digital envelop and recovering the embedded data in accordance to embodiments of this invention.

FIG. 2 depicts a concept of communications via multiple transponding satellites between a sender at a source 112 and a receiver at a destination 122. There are three segments including (1) a pre-processing at a communications source or a source 112, (2) a communications connectivity including multiple communication satellites 030-1 to 030-4, and (3) a post processing at a communications destination or a destination 122 downstream from the satellites 030-1 to 030-4. The information data Sx(t) is for user x and digital envelops are selected from a candidate envelop folder 180 which comprising of commonly known digital envelops to both the source 112 and the destination 122. There are probing signals, Pbx, will be incorporated as input at the source 112 and recovered at the outputs for continuously monitoring the "health" of the dynamic communications connectivity.

In the depicted example, there are 4 K-muxed outputs ye1, ye2, ye3, and ye4 from a transform of enveloping 130 in the source 112. After frequency up-converted, modulated, and power amplified, the first information stream ye1 is sent to a first satellite 030-1. Similarly, the second information stream ye2, the third information stream ye3, and the forth information stream ye4 are respectively transported via the second satellite 030-2, the third satellite 030-3, and the fourth satellite 030-4 to the destination 122. The RF frequencies, modulations, power levels for the 4 outputs ye1, ye2, ye3, and ye4 linking to the 4 satellites 030-1 to 030-4 may be different completely. At the destination 122 after low-noise, demuxing transformed may be implemented for both (1) de-enveloping received information data substreams and (2) de-aggregating the de-enveloped information substreams to reconstitute original information data stream Sx(t) for user x and the probing data stream Pbx.

The 4 satellites may be transponding satellites which may be in a same frequency slot or in different frequency bands at different orbital slots, regenerative satellites with on-board de-modulators and re-modulators, or combinations of all above. The propagation delays shall be equalized to line-up the data frames of information data streams. For 10 Mbps streams the timing accuracy may be in the order of 100 nanoseconds or $10^{-7}$ seconds.

In comparing with time synchronization requirements on applications of coherent WF muxing among multiple Ku band channels with carriers at ~12 GHz band, the timing accuracy must be better than $10^{-13}$ seconds for lining up carrier phases within 1°.

Figure 2A:
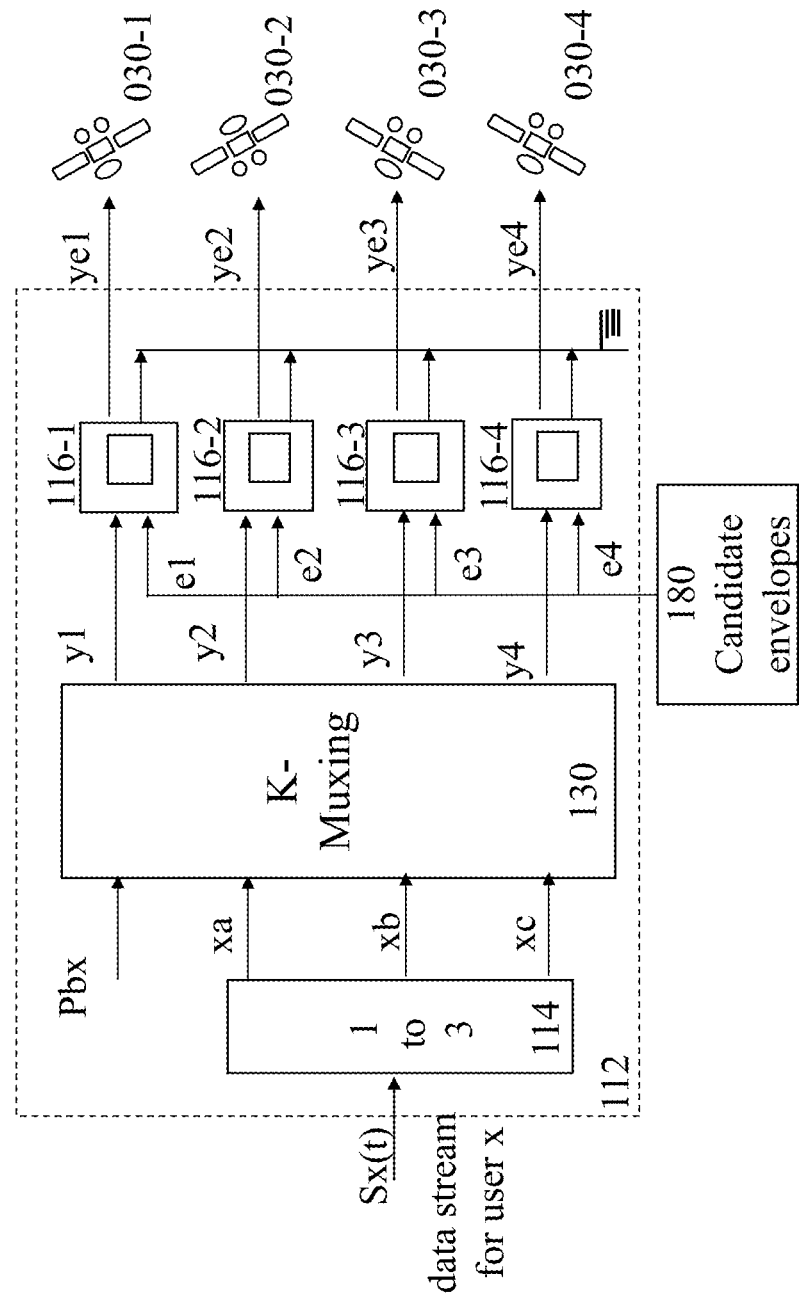
FIG. 2A depicts a block diagram on digital enveloping for 4 K-muxed digital files by a sender at a source, sending 4 independent digitally enveloped outputs to a destination via multiple satellites, according to some embodiments of this invention.
Figure 2B:
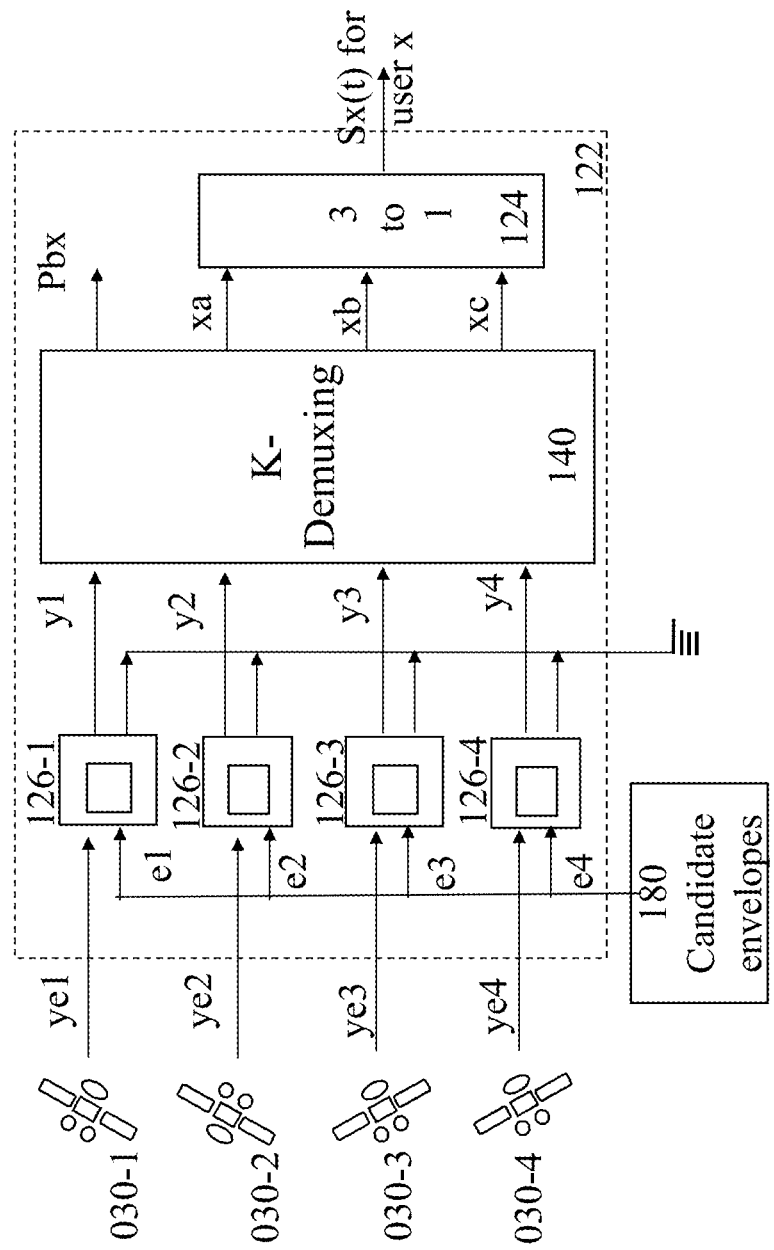
FIG. 2B depicts a block diagram on de-enveloping on 4 received data streams from 4 satellites with locally available digital envelopes and then reconstituting the original sub-files via a 4-to-4 K-demuxing according to embodiments of this invention.

The block diagrams in FIG. 2A and FIG. 2B are complimentary to each other. FIG. 2A illustrates more detailed functional blocks at the source 112 in FIG. 2. There are three major and separated functional blocks; the functions of segmenting 114, K-muxing 130, and enveloping 116-1 to 116-4. The enveloping 116-1 to 116-4 are concurrently carried out by 4 sets of 2-to-2 K-muxing with functions identical to the preprocessing 130 in FIG. 1A. There are two sets of sequential K-muxing operations in FIG. 2A; the K-muxing 130 for generating 4 different aggregations [y1, y2,y3,y4] from 4 inputs [Pbx, xa, xb, xc], each aggregation followed by one of the 4 enveloping processors 116-1 to 116-4, each of which performs a 2-to-2 K-muxing transform under customized configurations.

The first input is a probing data stream, Pbx. An information data stream Sx(t), intended for a user x in a destination, is segmented into 3 information data substreams xa, xb and xc which are connected to 3 of the 4 inputs of the K-muxing 130.

There are 4 outputs from the K-muxing function 130; y1, y2, y3, and y4; which shall be referred to as 4 K-muxed data substreams are then digitally enveloped by the 4 enveloping processor 116-1 to 116-4. The enveloped K-muxed data substreams, ye1 to ye4, are then sent to the 4 satellites 030-1 to 030-4 concurrently after properly and independently modulated, frequency converted, filtered; and then power amplified.

The K-muxing 130 is characterized by the following 4 simultaneous linear equations;

$$W11*Pbx+W12*xa+W13*xb+W14*xc=y1 \quad (8\text{-}1)$$

$$W21*Pbx+W22*xa+W23*xb+W24*xc=y2 \quad (8\text{-}2)$$

$$W31*Pbx+W32*xa+W33*xb+W34*xc=y3 \quad (8\text{-}3)$$

$$W41*Pbx+W42*xa+W43*xb+W44*xc=y4 \quad (8\text{-}4)$$

These equations can be written in matrix form;

$$[W][X]=[Y] \quad (8)$$

where $$[X]=[Pbx,xa,xb,xc]^T \quad (8a)$$

$$[Y]=[y1,y2,y3,y4]^T \quad (8b)$$

$$[W]=[Wij \text{ in a } 4\times4 \text{ format}] \quad (8c)$$

When [W] is a 4×4 Hadamard matrix or any matrix with an existing inversed matrix, the 4 linear equations (8-1) to (8-4) are independent. When [Y] is known and/or available at a destination 122, all 4 unknown components in the [X], or Pbx, xa, xb, and xc can be solved or calculated.

It is noticed that for any scenarios where the Pbx is known at a destination, the 4 simultaneous linear equations (8) can be written as $$W12*xa+W13*xb \; W14*xc=y1-W11*Pbx \quad (9\text{-}1)$$

$$W22*xa+W23*xb+W24*xc=y2-W21*Pbx \quad (9\text{-}2)$$

$$W32*xa+W33*xb+W34*xc=y3-W31*Pbx \quad (9\text{-}3)$$

$$W42*xa+W43*xb+W44*xc=y4-W41*Pbx \quad (9\text{-}4)$$

When [Y] is available from satellites and Pbx is known a priori, there are 4 simultaneous linear equations for all 3 unknown components in the [X]; or xa, xb, and xc. Therefore there is one built-in redundancy in the four components of [Y]. We only need three of the 4 equations (9-1) to (9-4) solving for the three unknowns; xa, xb, and xc.

In the 4 enveloping processors 116-1 to 116-4, each featuring 2 inputs and two outputs shall perform the identical enveloping transform as those shown in the preprocessor (enveloping) 130 with two inputs and two outputs in FIG. 1A. In anyone of the 4 enveloping processors 116-1 to 116-4, one of the two inputs is a K-muxed segmented data substream (one of y1 to y4) and the other input is a selected digital envelope stream from a candidate envelop folder 180. The selected envelops are e1, e2, e3, and e4 for the enveloping processors 116-1, 116-2, 116-3 and 116-4, respectively. Furthermore only one of the two outputs is sent for a satellite relay and the other is grounded.

These digital envelopes (e1, e2, e3, and e4) are from a candidate envelope folder 180. All the potential envelops are stored in the envelope folders, and shall be are known to both the source 112 and the destination 122. We may choose 4 completely different digital envelops for all 4 K-muxed information data substreams; y1, y2, y3, and y4. On the other hand on the other extreme, we may select an identical envelop for all 4 of them for transport to individual satellites 030-1 to 030-4. Mostly we choose some identical and other different envelops.

The K-muxing 130 may be via orthogonal matrixes or non-orthogonal matrixes, as long as their inverse matrixes exist.

FIG. 2B illustrates more detailed functional blocks at the destination 122 in FIG. 2. It is also a corresponding block diagram of data processing functions to those depicted in FIG. 2A. There are three major and separated functional blocks; the functions of de-enveloping 126-1 to 126-4, K-demuxing 140, and de-segmenting 124.

The enveloped K-muxed data substreams, ye1 to ye4, are recover from the 4 satellites 030-1 to 030-4 after low-noise amplified, frequency converted, properly filtered, and then de-modulated.

In the 4 de-enveloping processors 126-1 to 126-4, each featuring 2 inputs and two outputs shall perform the identical de-enveloping transform as those shown in the post-processor (de-enveloping) 140 with two inputs and two outputs in FIG. 1A. In anyone of the 4 de-enveloping processors 126-1 to 126-4, one of the two inputs is a recovered enveloped K-muxed segmented data substream (one of ye1 to ye4) and the other input is a selected digital envelope stream from a local digital envelop folder 180. Furthermore only one of the two outputs is sent for K-demuxing 140 and the other is grounded.

The 4 inputs to the K-demuxing 140; y1, y2, y3, and y4; referred to as 4 recovered K-muxed data substreams which have been digitally de-enveloped by the 4 de-enveloping processor 126-1 to 126-4. These digital envelopes are from an envelope folder 180. All the potential envelops are in the envelope folders, and shall be are known to both the source 112 and the destination 122.

The K-demuxing 140 must perform a corresponding transform an inversed transform to that of the K-muxing 130 in FIG. 2A, featuring an orthogonal matrixes or a non-orthogonal matrixes, as long as their inverse matrixes exist.

The 4 outputs from the K-demuxing 140 shall be the recovered Pbx data stream and 3 recovered segmented information data substreams xa, xb and xc The information data stream Sx(t), intended for a user x in the destination 122, is reconstituted through the de-segmenting 124 from the recovered 3 information data substreams.

In scenarios with known Pbx at a destination 122, the receiver at the destination 122 requires to capture any 3 of the 4 satellite-relayed or satellite-transponded enveloped K-muxed information substreams; ye1, ye2, ye3, ye3, and ye4. Three of the 4 de-enveloping processors 126-1 to 126-4 shall de-envelope all three of them, recovering a set of three of the 4 K-muxed information data substreams; y1, y2, y3, and y4. According to Equations (9-1) to (9-4), the K-demuxing 140 shall also be configured for solving three unknowns (xa, xb, and xc) based on only three recovered K-muxed information substreams; a set of three from [y1, y2, y3, y4].

Figure 2C:
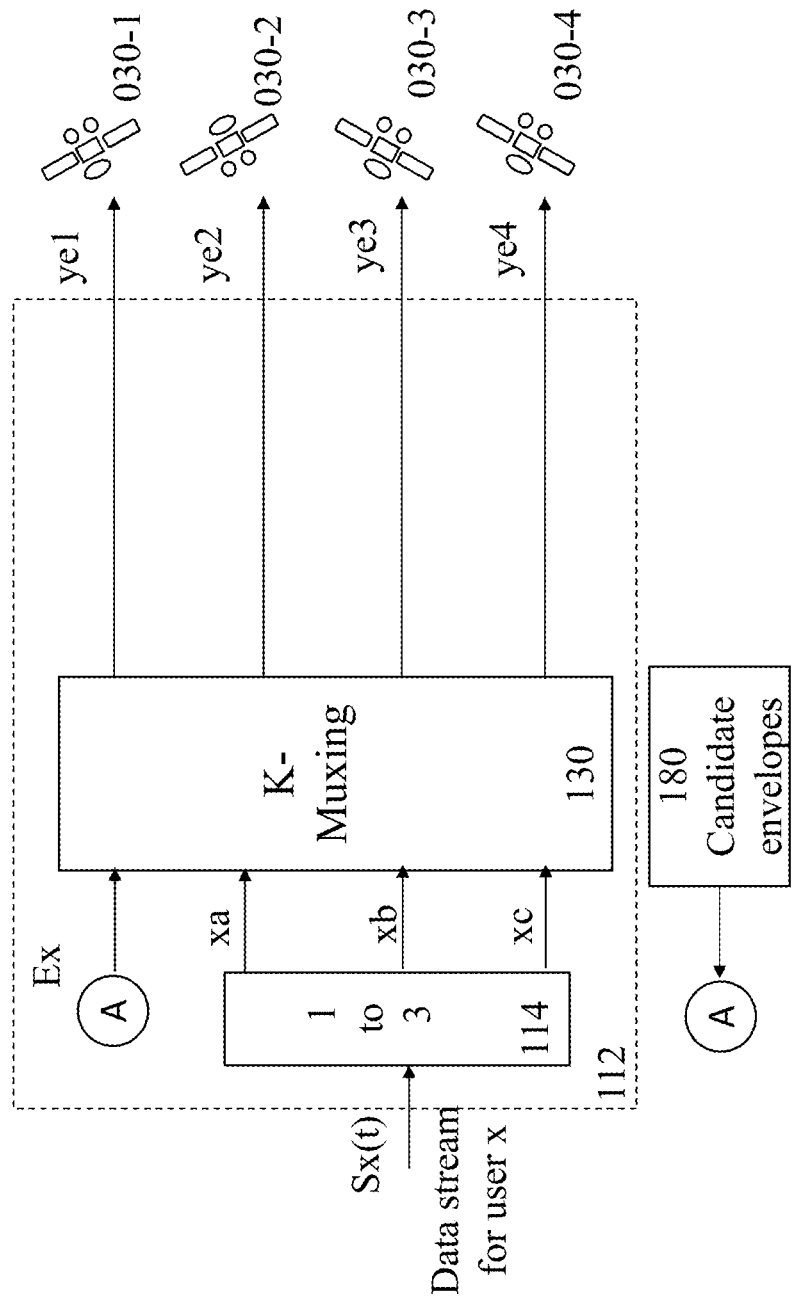
FIG. 2C depicts another block diagram on digital enveloping for 4 K-muxed digital files by a sender at a source, sending 4 digitally enveloped outputs to a destination via multiple satellites, according to some embodiments of this invention.
Figure 2D:
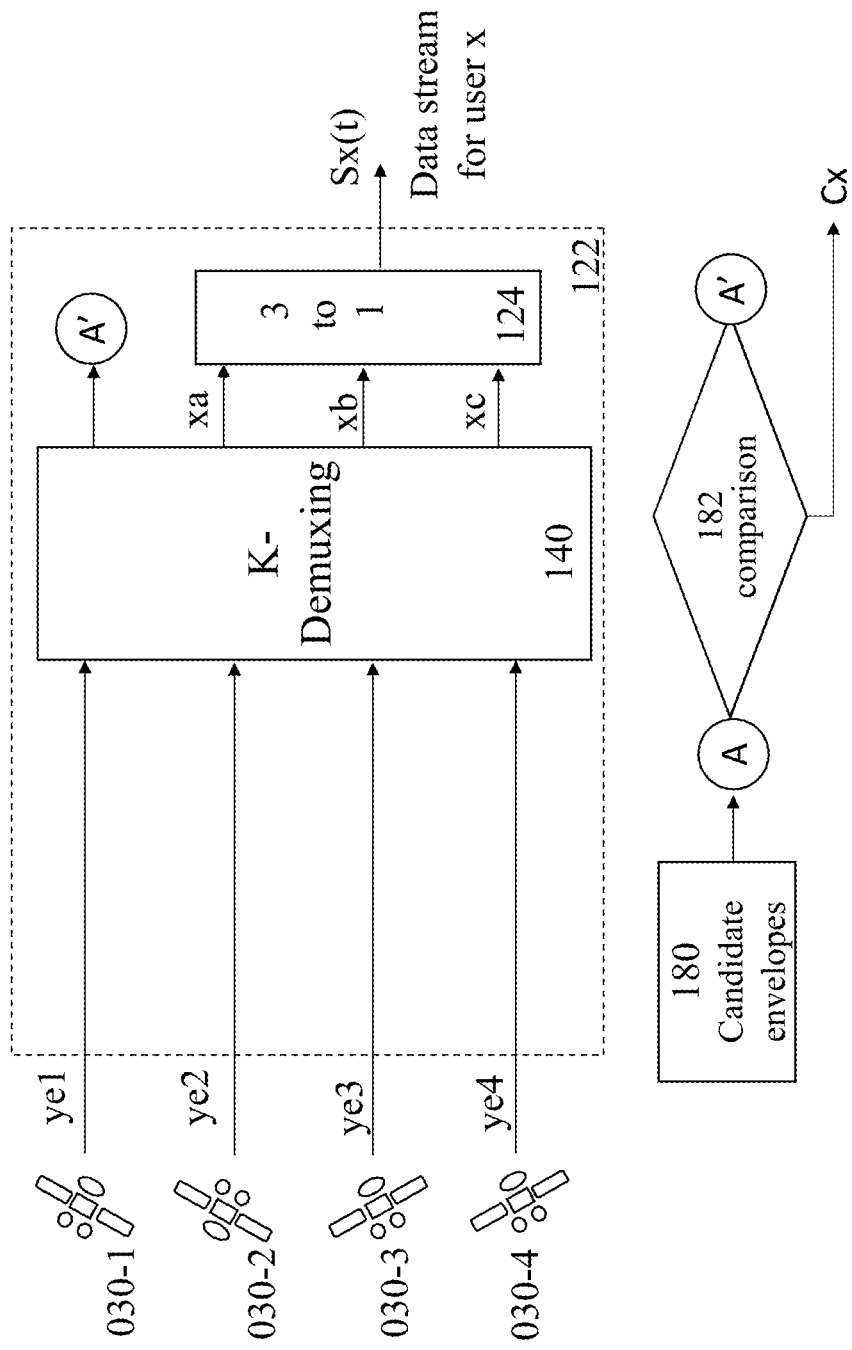
FIG. 2D depicts another block diagram on de-enveloping on 4 received data streams from 4 satellites with a locally available digital envelope and then reconstituting the original sub-files via a 4-to-4 K-demuxing according to embodiments of this invention.

The block diagrams in FIG. 2C and FIG. 2D are complimentary to each other in a configuration for enveloping 4 K-muxed information substreams by same formatted envelops. FIG. 2C illustrates the configuration of more detailed functional blocks at the source 112 in FIG. 2. There are two major and separated functional blocks; the functions of segmenting 114, and those of K-muxing. 130 which features concurrent enveloping. An information data stream Sx(t), intended for a user x in a destination, is segmented into 3 information data substreams xa, xb and xc which are connected to 3 of the 4 inputs of the K-muxing 130. The $4^{th}$ input is a data stream of a digital envelop Ex selected from the candidate envelop folder 180.

Let us assume a 4-to-4 Hadamard transform be the matrix for K-muxing 130. The K-muxed files ye1, ye2, ye3 and ye4 are the 4 outputs from the K-muxing 130. To create camouflaged effects on the 4 K-muxed data for wireless transport; the original digital envelope Ex has been "heavily weighted" before the K-muxing 130 operation.

As an example, E5 features a Chinese painting of a "running horse" shown in FIG. 1, and E5(t) is selected as Ex for the input of y1 in a digital picture format. In order to assure that the E5(t) image of the Chinese horse painting in y1 to be more dominant features in the 4 multiplexed outputs as camouflaged, we have emphasized the pixel intensities of y1 via:

$$\begin{bmatrix} ye1 \\ ye2 \\ ye3 \\ ye4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} am*y1 \\ y2 \\ y3 \\ y4 \end{bmatrix} \quad (10)$$

where am>1. Usually the amplification factor "am" is set to be greater than 10. It is also assumed the 4 inputs which were re-formatted into a pixel lattice have been fully equalized. Depending on the selection of a camouflaging image, the emphasizing factor, am, may applied to any of the input images in [Y]. As a result, the image of "running horse" painted by Xu Baihong becomes dominant among the 4 participating inputs and appears on all 4 outputs of the K-muxing 130. The 4 K-muxed data, i.e. ye1, ye1, ye3 and ye4, shall feature a same appearance of "running horse" with various intensity settings; as depicted in the 4 digital images on the second row of FIG. 2E. We shall describe FIG. 2E in following paragraphs in details.

FIG. 2D illustrates more detailed functional blocks at the destination 122 in FIG. 2. It is also a corresponding block diagram of data processing functions to those depicted in FIG. 2C. There are two major and separated functional blocks; the functions of K-demuxing 140 including de-enveloping, and de-segmenting 124.

The 4 inputs to the K-demuxing 140; ye1, yet, ye3, and ye4; will be digitally de-enveloped and de-aggregated concurrently. The K-demuxing 140 shall perform an inversed transform to a corresponding one in K-muxing 130 in FIG. 2C. Its transform is characterized by:

$$\begin{bmatrix} am^*y1 \\ y2 \\ y3 \\ y4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} ye1 \\ ye2 \\ ye3 \\ ye4 \end{bmatrix} \quad (11)$$

where [y1, y2, y3, y4]=[E5, xa, xb, xc],

Four outputs from the K-demuxing 140 shall include a recovered digital envelop E5, and 3 recovered segmented information data substreams xa, xb, and xc. The information data stream Sx(t), intended for user x in the destination 122, is reconstituted through the de-segmenting 124 from the recovered 3 information data substreams [xa, xb, xc].

An original digital envelope from a candidate envelope folder 180 shall be used for a digital comparison 182 to the recovered envelop bit-by-bit for data integrity monitoring.

Figure 2E:
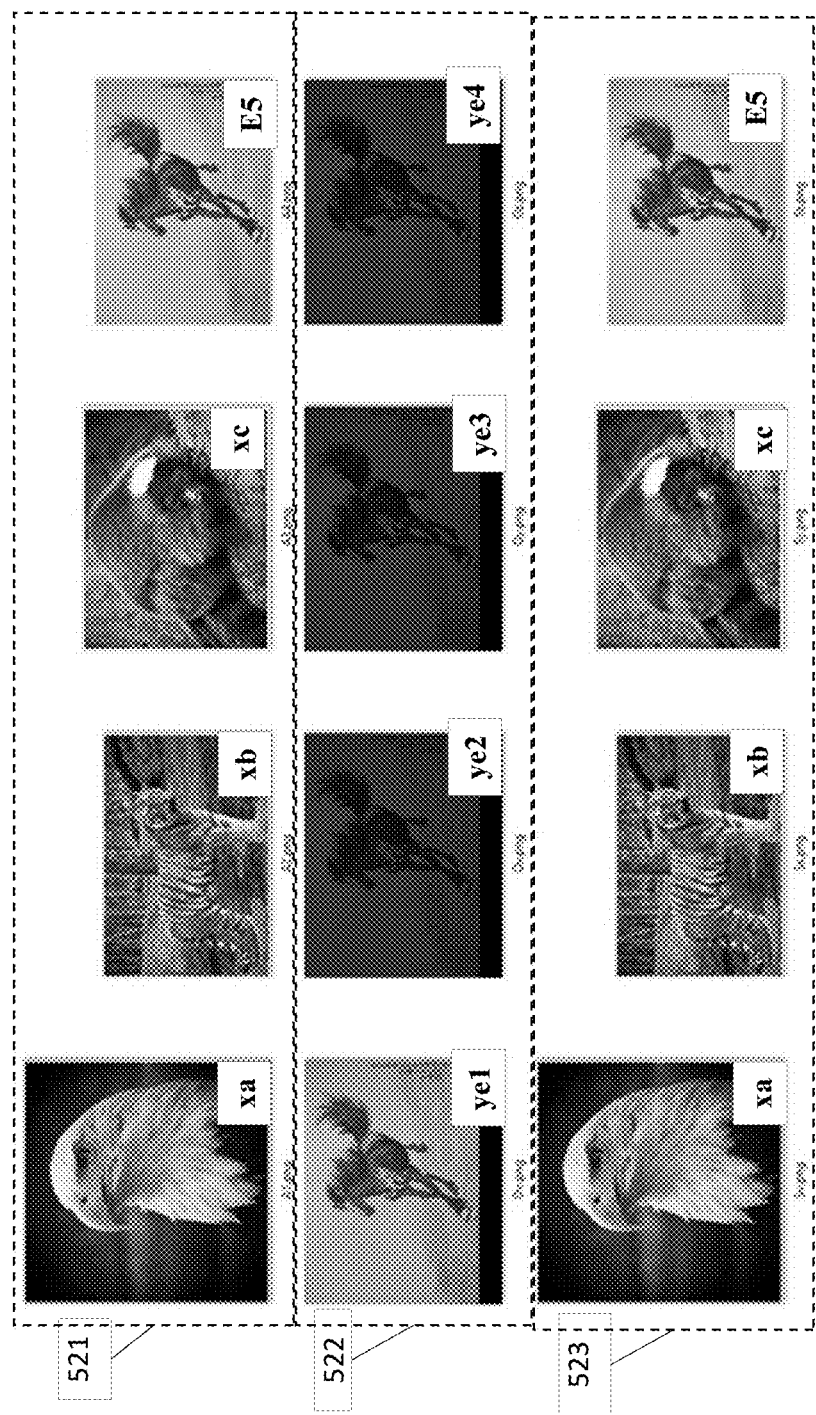
FIG. 2E depicts simulation results for enveloping/de-enveloping; a modified replicate of FIG. 5D from U.S. Pat. App. Pub. No. 20150032706 A1.
Figure 5:
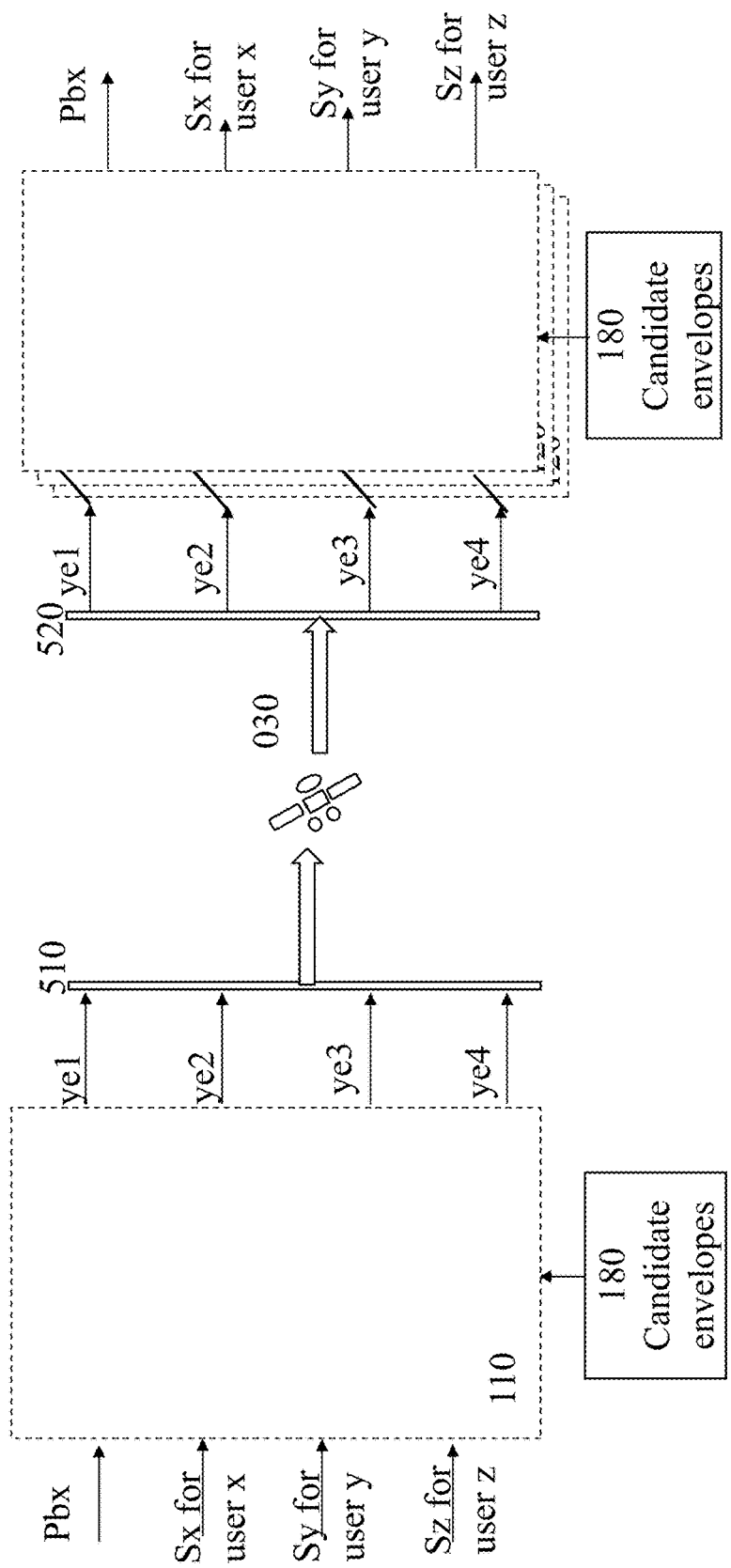
FIG. 5 illustrates a block diagram on (1) K-muxing 3 digital files into 4 K-muxed or K-transformed files, enveloping the K-muxed files, and then multiplexing the enveloped data streams via conventional FDM, TDM, CDM or combinations of all above by a sender at a source, (2) sending the multiplexed and enveloped data streams through 4 different transponders, time-slots, frequency slots, or CDM channels of a satellite to 3 destinations, and (3) in each destination a designated signal is reconstituted through both de-enveloping the received signals and K-demuxing the recovered K-muxed digital data sets in accordance to embodiments of this invention.

FIG. 2E is a modified replicate of FIG. 5 in US patent application publication No. 20150032706. There are 12 images on three panels. The labels have been modified to become consistent with those in this patent application. The four digital streams depicted on the top panel 521 are the 4 inputs to equation (10); y2, y3, y4, and y1 where y2=xa, y3=xb, y4=xc, and y1=E5. The 4 outputs of Equation (10) depicted on the middle panel 522 are [ye1, ye2, ye3, ye4]. As shown on their appearances, each of the 4 outputs has been digital enveloped by a common envelop E5 but with various brightness.

The 4 images on the bottom panel 523 are result of K-demuxing 140 characterized by Equation (11). The four inputs to Equation (10) are the digital streams on the middle panel 522, and corresponding 4 concurrent outputs are the digital image streams [y1, y2, y3, y4], which equal to [xa, xb, xc, E5] on the bottom panel 523.

In a different embodiment, referring back to FIG. 2, only 3 of the 4 outputs [ye1, ye2, ye3, ye4] from a source 112 are delivered to three of the 4 satellites 030-1 to 030-4. In this embodiment with a configuration of FIG. 2A and FIG. 2B, the receiver in a destination 122 must have access of the probing data stream Pbx in order to recover [xa, xb, xc] through K-demuxing 122 and then reconstituting Sx(t) from [xa, xb, xc] via a de-segmenting function 124.

Similarly, with a configuration of FIG. 2C and FIG. 2D, the receiver in a destination 122 must have access of the digital envelop data stream Ex in order to recover [xa, xb, xc] through K-demuxing 140 and then reconstituting Sx(t) from [a, xb, xc] via a de-segmenting function 124.

In other embodiments of FIG. 2, FIG. 2A, FIG. 2B, FIG. 2C and FIG. 2D, any satellite links between a source and a destination may be replaced by airborne platform based links, a cellular links, wireless terrestrial links, and/or links via cloud.

Embodiment 3

Figure 3:
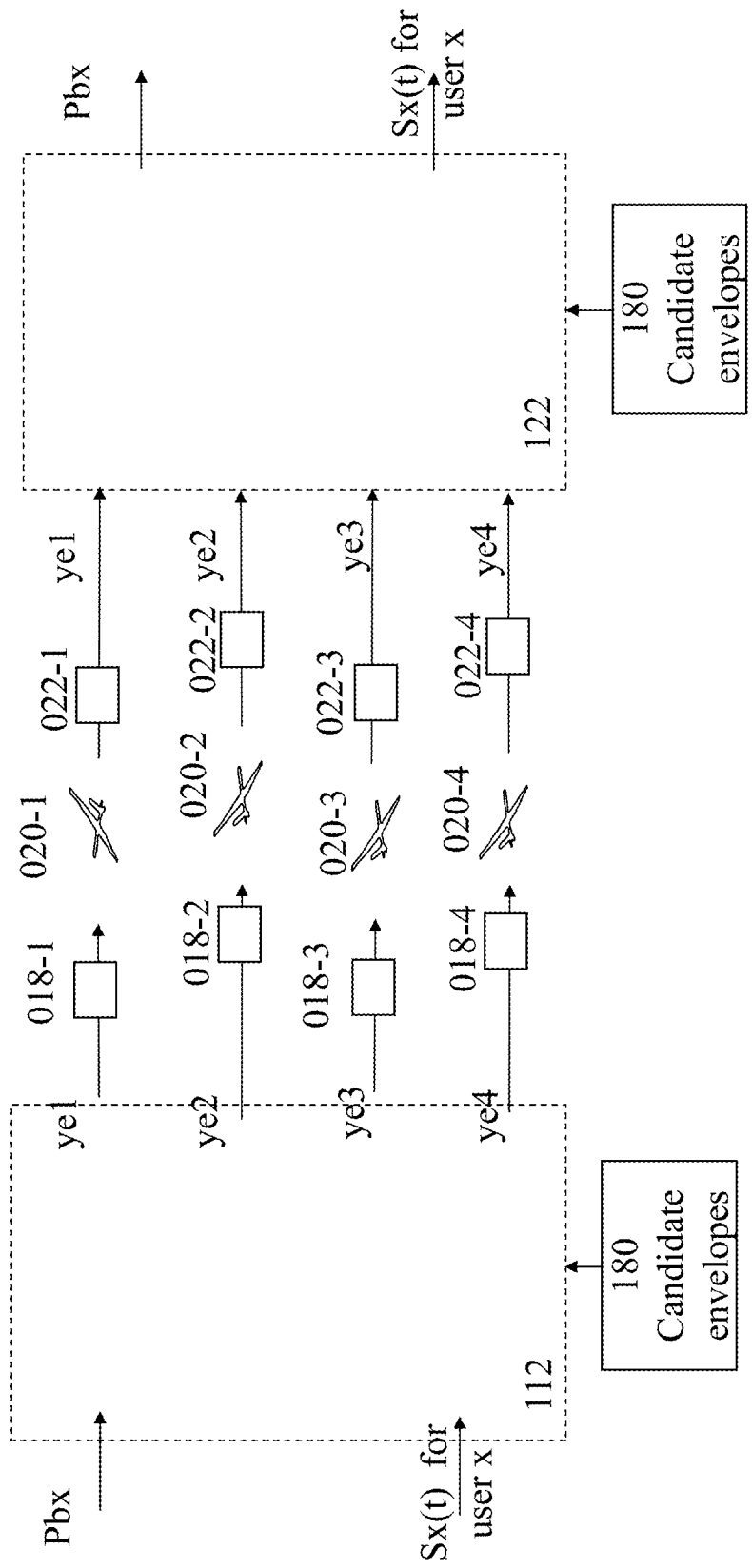
FIG. 3 depicts a block diagram on "sealing" digital envelopes for an embedded digital file via a K-muxing processor by a sender at a source, sending all 4 outputs as the digitally enveloped data to a destination via multiple UAVs, and "de-enveloping" the digital envelops and recovering the embedded data at the destination in accordance to embodiments of this invention.

FIG. 3 depicts a communications concept via multiple airborne platforms 020-1 to 020-4 including unmanned air vehicles (UAVs) between a sender at a source 112 and a receiver at a destination 122. There are three segments including (1) a pre-processing at a communications source or a source 112, (2) a communications connectivity including multiple links via airborne platforms 020-1 to 020-4, and (3) a post-processing at a communications destination or a destination 122 downstream from the airborne platforms or air-platforms 020-1 to 020-4. The information data Sx(t) is for user x and digital envelops are selected from a candidate envelop folder 180 which comprising of commonly known digital envelops to both the source 112 and the destination 122. There are probing signals, Pbx, which will be incorporated as an input at the source 112 and recovered at the outputs for continuously monitoring the "health" of the dynamic communications channels in the destination 122. This configurations are identical to the ones in FIG. 2, except the satellites 030-1 to 030-4 in FIG. 3 are replaced by the airborne platforms 020-1 to 020-4. Furthermore in FIG. 3, modulators 018-1 to 018-4, and de-modulators 022-1 to 022-4 are high-lighted; indicating that the incoherent K-muxing/K-demuxing are applied to information data streams not on signal data (waveform) streams.

In the depicted example, there are 4 K-muxed outputs ye1, ye2, ye3, and ye4 from the source 110. After a modulations 018-1 followed by frequency up-conversion, and power amplification, the first information stream ye1 is sent to a first air-platform 020-1. Similarly, the second information stream ye2 after a modulation 018-2, the third information stream ye3 after a modulation 018-3, and the forth information stream ye4 after a modulation 018-4 are respectively transported via the second air-platform 020-2, the third air-platform 020-3, and the fourth air-platform 020-4 to the destination 122. At the destination 122, 4 received signals from the air-platforms 020-1 to 020-4 after low-noise amplification, filtering, frequency-conversion, will be converted by base-band de-modulation 022-1 to 022-4 into 4 enveloped K-muxed information data substreams. K-demuxing transforms are implemented for both de-enveloping received information data substreams, and de-aggregating the de-enveloped information substreams reconstituting original information data stream Sx(t) for user x and the probing data stream Pbx.

The 4 air-platforms 020-1 to 020-4 may feature transponding repeaters operated in different frequency bands at different orbiting/parking or cruising slots, regenerative repeaters with on-board de-modulators and re-modulators, or combinations of both. The propagation delays shall be equalized to lineup the data frames of information data streams. For 10 Mbps streams the timing accuracy shall be in the order of 100 nanoseconds or $10^{-7}$ seconds.

Figure 3A:
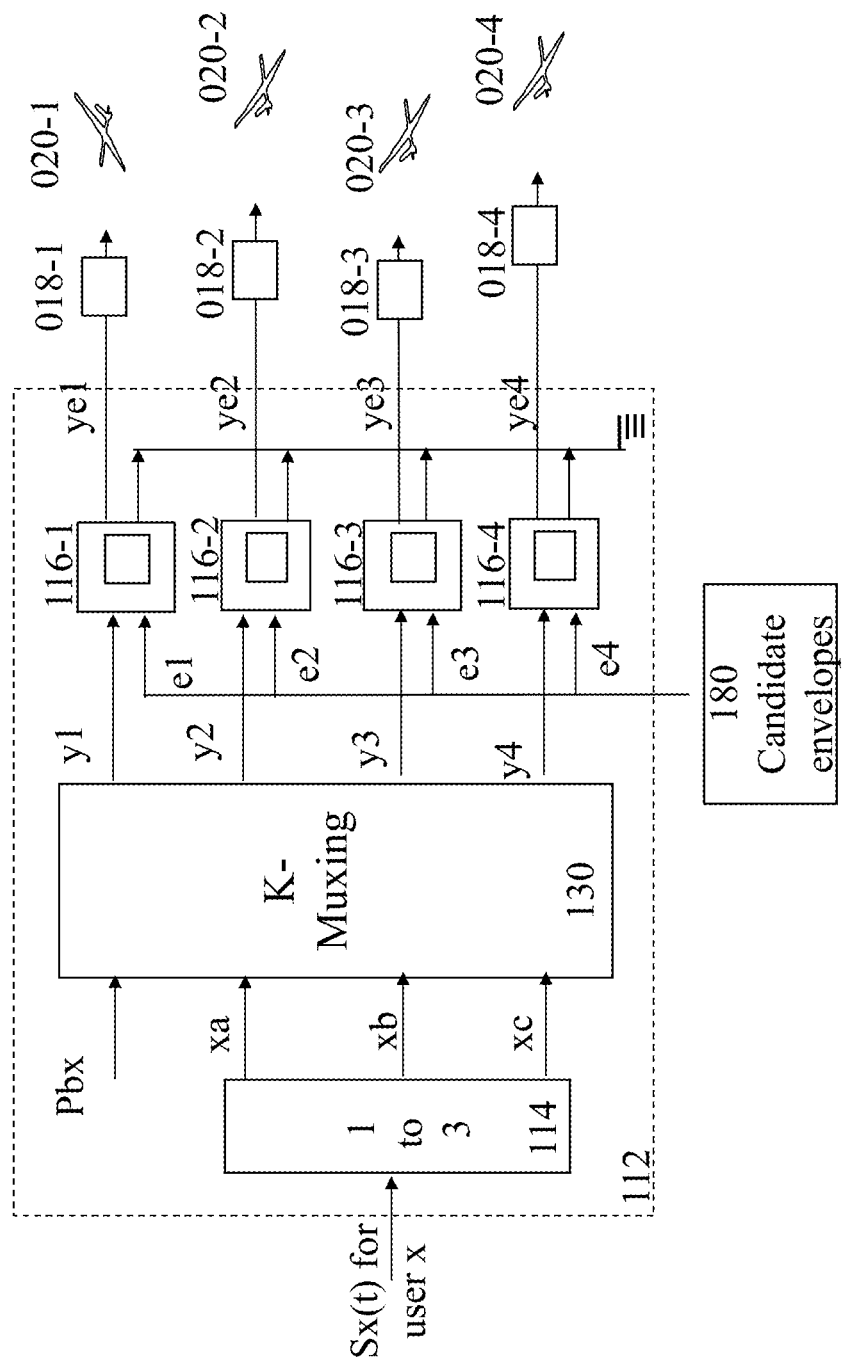
FIG. 3A depicts a block diagram on digital enveloping for 4 K-muxed digital files by a sender at a source, sending 4 independent digitally enveloped outputs to a destination via multiple UAVs, according to some embodiments of this invention.
Figure 3B:
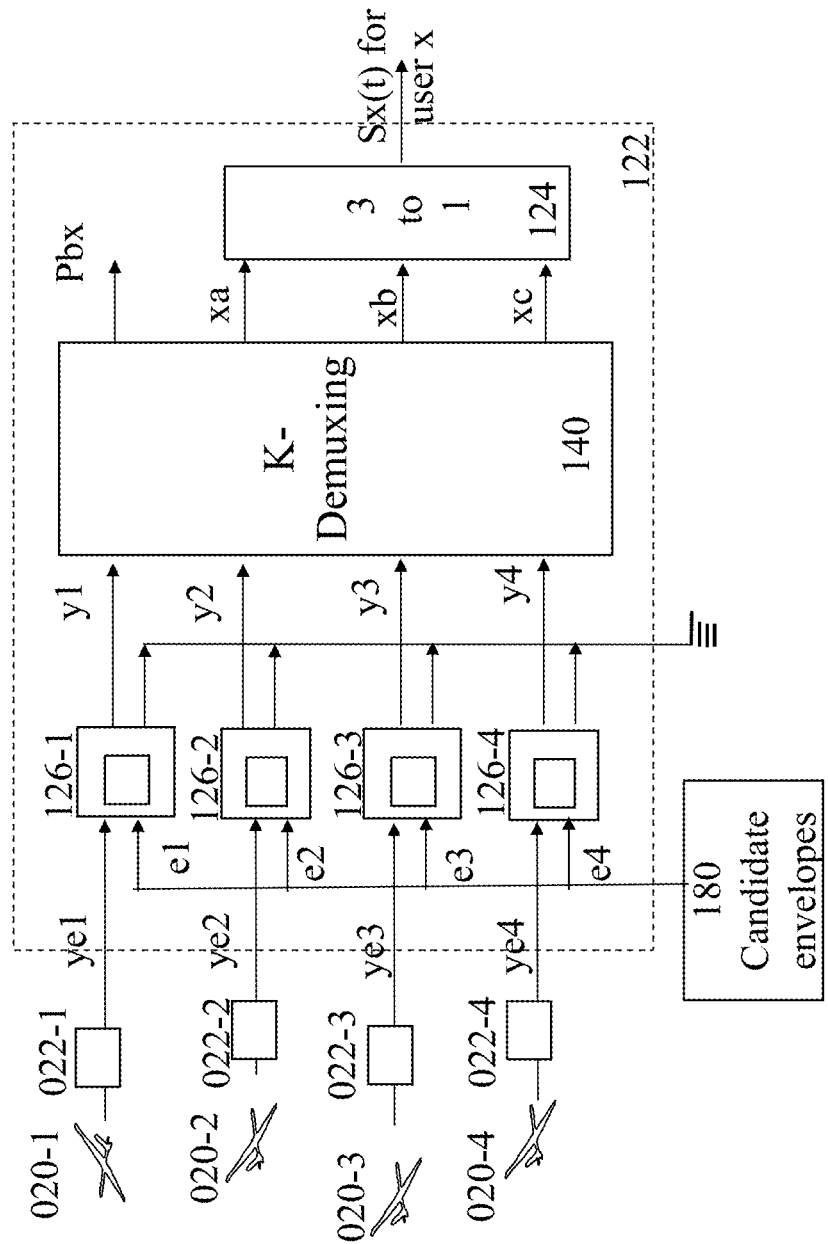
FIG. 3B depicts a block diagram on de-enveloping on 4 received data streams from 4 UAVs with locally available digital envelopes and then reconstituting the original sub-files via a 4-to-4 K-demuxing according to embodiments of this invention.

The block diagrams in FIG. 3A and FIG. 3B are complimentary to each other. FIG. 3A illustrates more detailed functional blocks at the source 112 in FIG. 3. There are three major and separated functional blocks; the functions of segmenting 114, K-muxing 130, and enveloping 116-1 to 116-4. The enveloping 116-1 to 116-4 are concurrently carried out by 4 sets of 2-to-2 K-muxing with functions identical to the enveloping 116 in FIG. 1A.

There are two sequential K-muxing operations for data aggregating and data enveloping in FIG. 3A. The K-muxing 130 generates 4 aggregations [y1, y2, y3, y4] from the same inputs [Pbx, xa, xb, xc]. The first input of the K-muxing 130 is a probing data stream, Pbx. An information data stream Sx(t) at a source 110, intended for a user x in a destination 122, is segmented into 3 information data substreams xa, xb, and xc which are connected to the remaining 3 of the 4 inputs of the K-muxing 130.

There are 4 outputs from the K-muxing function 130; y1, y2, y3, and y4; which shall be referred to as 4 K-muxed data substreams are then digitally enveloped by the 4 enveloping processor 116-1 to 116-4. The 4 enveloping processors 116-1 to 116-4 performing individually a 2-to-2 K-muxing transform under customized configurations featuring two outputs each and one of two is grounded.

The enveloped K-muxed data substreams, ye1 to ye4, are properly modulated by modulators 018-1 to 018-4 before being sent to the 4 air-platforms 020-1 to 020-4 concurrently after frequency converted, filtered, and then power amplified.

The 4-to-4 K-muxing 130 for data aggregation is characterized by the 4 simultaneous linear equations (8-1) to (8-4). It may be implemented as a transform by a 4×4 Hadamard matrix or any matrix with an existing inversed matrix. As a result, the 4 linear equations (8-1) to (8-4) are independent. When [Y] or [ye1, ye2, ye3, ye4] becomes known and/or available at a destination 122, all 4 unknown components in the [X], or [Pbx, xa, xb, xc] can be solved or calculated.

It is noticed that for any scenarios where the Pbx is known at a destination, the 4 simultaneous linear equations (8) can be written as equations (9-1) to (9-4). When [Y] is available from air-platforms and Pbx is known a priori, there are 4 simultaneous linear equations for all 3 unknown components in the [X]; or xa, xb, and xc. Therefore there is a built-in redundancy in the four components of [Y]. We only need any three of the 4 equations (9-1) to (9-4) in solving for the three unknowns; xa, xb, and xc.

In the 4 enveloping processors 116-1 to 116-4, each featuring 2 inputs and two outputs shall perform the identical enveloping transform as those shown in the enveloping 116 with two inputs and two outputs in FIG. 1A. In anyone of the 4 enveloping processors 116-1 to 116-4, one of the two inputs is a K-muxed segmented data substream (one of y1 to y4) and the other input is a selected digital envelope stream from a candidate envelop folder 180. The selected envelops are e1, e2, e3, and e4 for the enveloping processors 116-1, 116-2, 116-3 and 116-4, respectively. Furthermore only one of the two outputs is sent for a corresponding air-platform and the other is grounded. We may choose 4 completely different digital envelops for all for 4 K-muxed information data substreams; y1, y2, y3, and y4. On the other hand, we may select an identical envelop for all 4 of them for transport to individual air-platforms 020-1 to 020-4.

FIG. 3B illustrates more detailed functional blocks at the destination 122 in FIG. 3. It is also a corresponding block diagram of data processing functions to those depicted in FIG. 3A. There are three major and separated functional blocks; the functions of de-enveloping 126-1 to 126-4, K-demuxing 140, and de-segmenting 124.

The enveloped K-muxed data substreams, ye1 to ye4, are recovered from the 4 air-platforms 020-1 to 020-4 after low-noise amplified, frequency converted, properly filtered, and then de-modulated by demodulators 022-1 to 022-4.

In the 4 de-enveloping processors 126-1 to 126-4, each featuring 2 inputs and two outputs shall perform the identical de-enveloping transform as those shown in the de-enveloping 126 with two inputs and two outputs in FIG. 1A. In anyone of the 4 de-enveloping processors 126-1 to 126-4, one of the two inputs is a recovered enveloped K-muxed data substream (one of ye1 to ye4) and the other input is a selected digital envelope stream from a local candidate envelop folder 180. Furthermore only one of the two outputs is sent for K-demuxing 140 and the other is grounded.

The 4 inputs to the K-demuxing 140; y1, y2, y3, and y4; referred to as 4 recovered K-muxed data substreams which have been digitally de-enveloped by the 4 de-enveloping processor 126-1 to 126-4. These digital envelopes are from an envelope folder 180. All the potential envelops are in the envelope folders, and shall be are known to both the source 112 and the destination 122.

The 4 outputs from the K-demuxing 140 shall be the recovered Pbx data stream and 3 recovered information data sub streams xa, xb and xc The information data stream Sx(t) intended for a user x in the destination 122, is reconstituted through the de-segmenting 124 from the recovered 3 information data substreams.

In another embodiment of FIG. 3, FIG. 3A, and FIG. 3B, any air-platform links between a source and a destination may be replaced by satellite links, cellular links, wireless terrestrial links, and/or links via cloud.

In other embodiments with a known Pbx at the destination 122, the receiver at the destination 122 requires to capture any 3 of the 4 relayed or transponded enveloped K-muxed information substreams; ye1, ye2, ye3, and ye4 from 4 air platforms 020-1 to 020-1. Three of the 4 de-enveloping processors 126-1 to 126-4 shall de-envelope all three of them, recovering a set of three of the 4 K-muxed information data substreams; y1, y2, y3, and y4. According to Equations (9-1) to (9-4), the K-demuxing 140 shall also be configured for solving three unknowns (xa, xb, and xc) based on only three recovered K-muxed information substreams; a set of three from [y1, y2, y3, y4].

The cascaded K-muxing/demuxing configurations for separated data aggregating and enveloping in FIGS. 3A and 3B can be modified similar to those in FIG. 2C and FIG. 2D.

Embodiment 4

Figure 4:
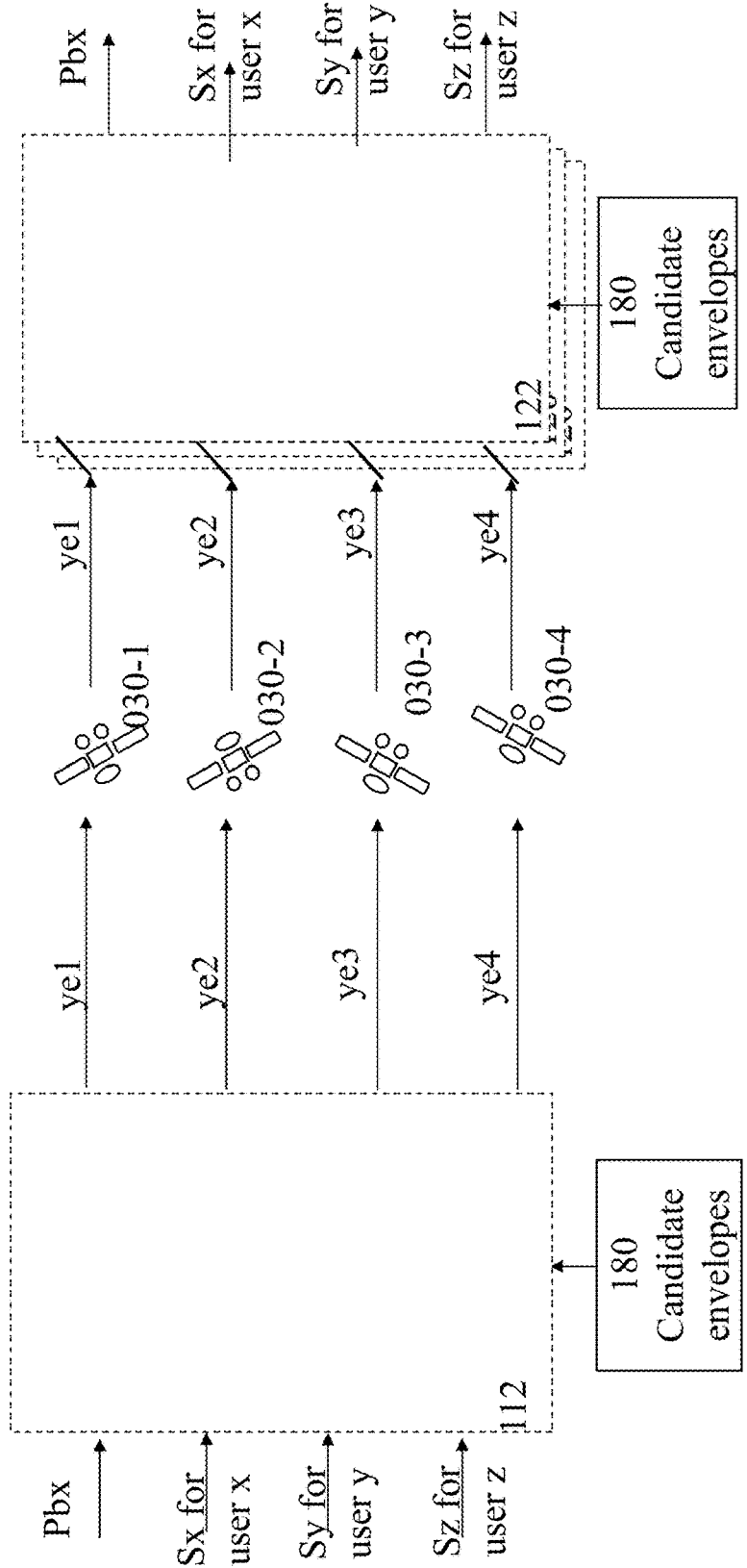
FIG. 4 illustrates a block diagram on (1) K-muxing 3 digital files into 4 K-muxed or K-transformed files, and then enveloping the K-muxed files by a sender at a source, (2) enveloped data sets transported through 4 different satellites to 3 destinations, and (3) in each destination a designated signal is reconstituted through both de-enveloping the received signals and K-demuxing the recovered K-muxed digital data sets in accordance to embodiments of this invention.

FIG. 4 depicts a block diagram of digital enveloping modified from that of FIG. 2. There are three user information data streams; Sx, Sy, and Sz in a source 112 to be delivered to three individual users; x, y, and z at three different destinations 122 with (1) improved privacy via digital enveloping and (2) enhanced availability via redundancy through K-muxing over multiple information data streams. The source 112 and the destinations 122 are under coverages of all 4 relaying satellites 030-1 to 030-4.

The block diagram in FIG. 4 shows a concept of communications via multiple satellites for concurrently delivering three information data streams [Sx, Sy, Sz] from a sender at a source 112 to receivers at various destinations 122. There are three segments including (1) a pre-processing at a communications source or a source 112, (2) a multi-link communications connectivity including multiple communication satellites 030-1 to 030-4, and (3) a post-processing at destinations 122 downstream from the communications satellites 030-1 to 030-4. The information data sets Sx(t), Sy(t), and Sz(t) are, respectively, for users x, y, and z. Respective digital envelops are selected from a candidate envelop file 180 in which digital envelops known a priori to a user community are stored. Both a sender in the source 112 and receivers at various destinations 122 are parts of the user community. There is a probing data stream, PBx, which will be incorporated as an input at the source 112 and recovered at various destinations 122 for continuously monitoring the "health" of the communications connectivity featuring dynamic multiple-links. The connectivity in this example shall survive under a sufficient condition even when only 3 of the 4 links are available.

Preprocessing at the source 112 produces 4 enveloped K-muxed outputs ye1, ye2, ye3, and ye4, as depicted in FIG. 4. After frequency up-conversion, modulation, proper filtering, and power amplification, the first information stream ye1 is sent to various destinations 122 via a first satellite 030-1. Similarly, the second information stream ye2, the third information stream ye3, and the forth information stream ye4 are respectively transported to the designated destinations 122 via the second satellite 030-2, the third satellite 030-3, and the fourth satellite 030-4.

At a first of the 3 destinations 122 after low-noise amplification, filtering, frequency-conversion, and de-modulation, both de-enveloping and de-aggregating are implemented in a post-processor via K-demuxing to reconstitute original information data stream Sx(t) for user x and the probing data stream Pbx. The de-enveloping is to process 4 received enveloped information data streams from ye1, ye2, ye3, and ye4, removing the digital envelopes. The de-aggregating performs a customized linear combination on the 4 de-enveloped information streams restoring a desired user information data stream, Sx(t).

Similarly at either a second or a third of the 3 destinations 120, a post-processor will reconstitute the probing data stream Pbx and an original information data stream Sy(t) or Sz(t), respectively.

The 4 satellites may be (1) transponding satellites operated in a common frequency slot or different frequency bands at different orbital slots, (2) regenerative satellites with on-board de-modulators and re-modulators, or (3) combinations of both above. The transponders from the 4 satellites 030-1 to 030-4 may refer to 4 different transponders in a same physical satellite, or N transponders in a first satellite and (4-N) others in a second satellite; where N is 1, 2, or 3. It may also be other combinations from three satellites.

The propagation delays shall be equalized to lineup the data frames of information data streams. For 10 Mbps streams the timing accuracy shall be in the order of 100 nanoseconds or $10^{-7}$ seconds.

Figure 4A:
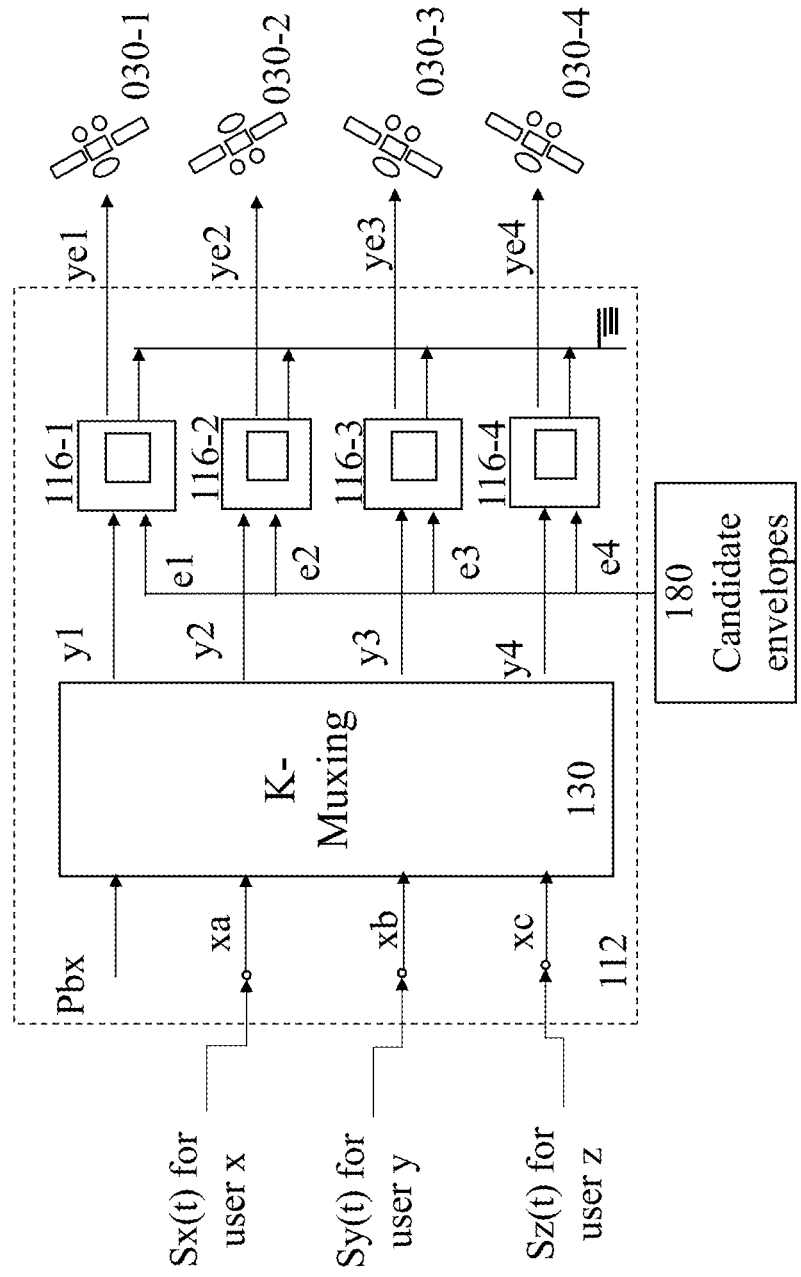
FIG. 4A depicts a block diagram on K-muxing 3 data streams into 4 K-muxed data streams and then digital enveloping 4 K-muxed digital streams by a sender at a source before sending the 4 digitally enveloped outputs to a destination via multiple satellites, according to some embodiments of this invention.
Figure 4B:
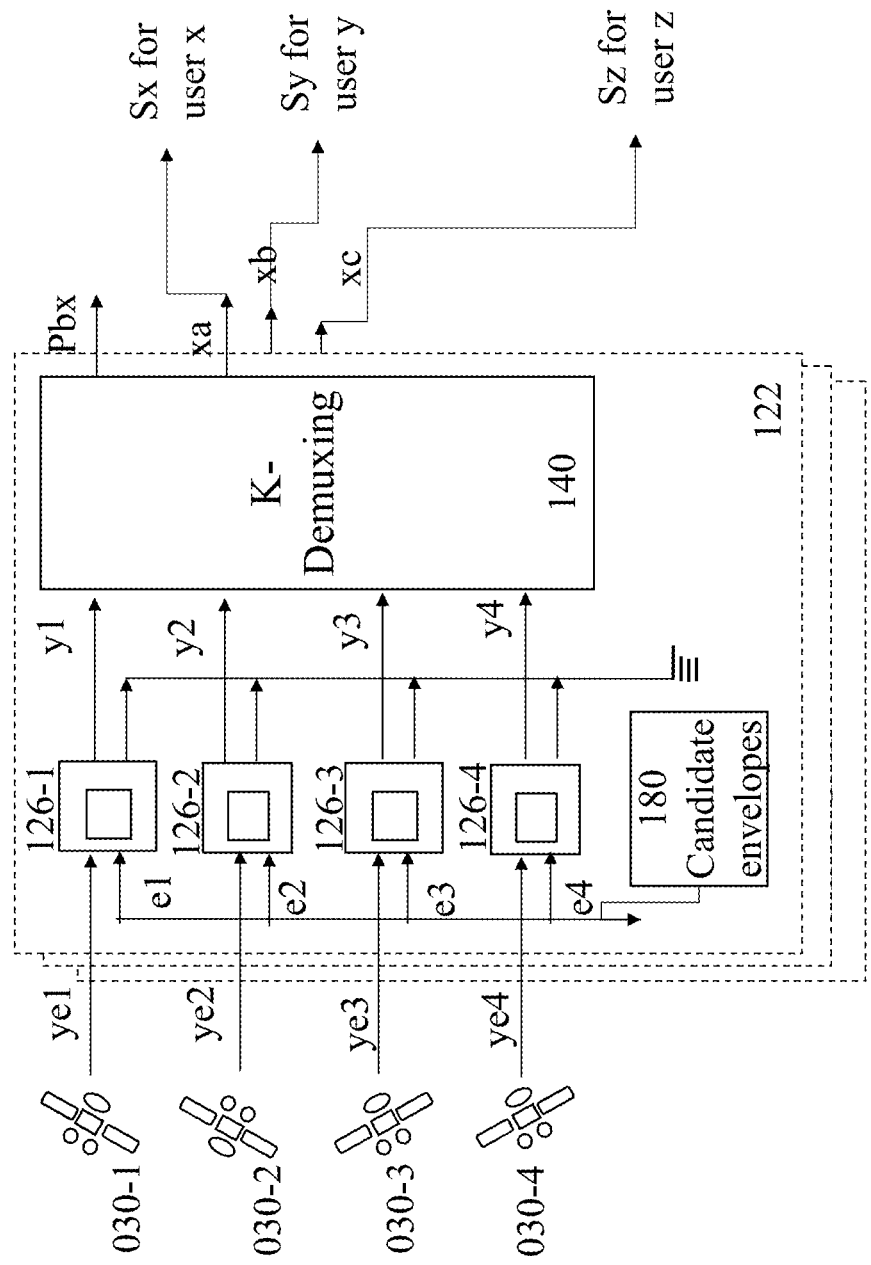
FIG. 4B depicts a block diagram on de-enveloping on 4 received data streams from 4 satellites with locally available digital envelopes and then reconstituting the original sub-files via a 4-to-4 K-demuxing according to embodiments of this invention.

The block diagrams in FIG. 4A and FIG. 4B are complimentary to each other. FIG. 4A illustrates more detailed functional blocks at the source 112 in FIG. 4. There are two major and separated functional blocks; the functions of information data stream mixing among 4 inputs via a 4-to-4 K-muxing 130, and those of enveloping 116-1 to 116-4. The enveloping 116-1 to 116-4 are concurrently carried out by 4 sets of 2-to-2 K-muxers with functions identical to the enveloping 116 in FIG. 1A.

There are two sequential K-muxing operations in FIG. 4A. The K-muxing 130 generating 4 aggregated outputs [y1, y2, y3, y4] among four information data streams, each followed by one of the 4 enveloping processors 116-1 to 116-4.

The first input for the K-muxing 130 is a probing data stream, Pbx. Information data streams Sx(t), Sy(t) and Sz(t) intended for a user x in a first, a user y in a second, and a user z in a third of the 3 destinations 120 are connected to last 3 of the 4 inputs of the K-muxing 130, respectively. Four outputs of different aggregations by the K-muxing 130 are the 4 linear combinations among the inputs of four information data streams; Pbx, Sx, Sy, and Sz. The 4 outputs from the function of K-muxing 130; y1, y2, y3, and y4; shall be referred to as 4 K-muxed data streams.

The 4 outputs are then digitally enveloped by the 4 enveloping processor 116-1 to 116-4; each performs a 2-to-2 K-muxing transform 116 under customized configurations. The enveloped K-muxed data streams, ye1 to ye4, are then sent to the 4 satellites 030-1 to 030-4 concurrently after properly modulated, frequency converted, filtered, and then power amplified.

We may set Sx(t)=xa, Sy(t)=xb, and Sz(t)=xz, and then the K-muxing 130 is characterized by the identical 4 simultaneous linear equations (8-1) to (8-4). These equations can be written in a matrix form in equation (8). When [W] is a 4×4 Hadamard matrix or any matrix with an existing inversed matrix, the 4 linear equations (8-1) to (8-4) are independent. When [Y] is known and/or available at a destination 122, all 4 unknown components in the [X], or [Pbx, xa, xb, xc] can be solved or calculated.

It is noticed that for any scenarios where the Pbx is known at a destination, the 4 simultaneous linear equations (8) can be written as equation (9-1) to (9-4). When [Y] becomes available from satellite links and Pbx is known a priori, there are 4 simultaneous linear equations for all 3 unknown components in the [X]; or xa, xb, and xc. Therefore there is one built-in redundancy in the four components of [Y]. We only need three of the 4 components in [Y] to solve for the three unknowns; xa, xb, and xc via equations (9-1) to (9-4).

In the 4 enveloping processors 116-1 to 116-4, each featuring 2 inputs and two outputs shall perform the identical enveloping transform as those shown in the function of enveloping 116 with two inputs and two outputs in FIG. 1A. In anyone of the 4 enveloping processors 116-1 to 116-4, one of the two inputs is a K-muxed segmented data stream (one of y1 to y4) and the other input is a selected digital envelope stream from a candidate envelop folder 180. The selected envelops are e1, e2, e3, and e4 for the enveloping processors 116-1, 114-2, 116-3 and 116-4, respectively. Furthermore only one of its two outputs is sent for a satellite communication channel and the other is grounded.

These digital envelopes (e1, e2, e3, and e4) are selected from a candidate envelope folder 180. All the digital envelops in the candidate envelope folder 180 shall be known to both the source 112 and the destination 122. We may choose 4 completely different digital envelops for all 4 K-muxed information data streams; y1, y2, y3, and y4. On the other hand, we may select an identical envelop for transporting all 4 to individual satellites 030-1 to 030-4.

The K-muxing 130 may be via orthogonal matrixes or through non-orthogonal matrixes, as long as their inversed matrixes exist.

FIG. 4B illustrates more detailed functional blocks at one of the 3 destinations 120 in FIG. 4. It is also a corresponding block diagram of data processing functions to those depicted in FIG. 4A. There are two major and separated functional blocks; the functions of de-enveloping 126-1 to 126-4, and de-aggregating via K-demuxing 140.

The 4 enveloped K-muxed data streams, ye1 to ye4, are recovered from the 4 satellites 030-1 to 030-4 after low-noise amplified, frequency converted, properly filtered, and then de-modulated.

In the 4 de-enveloping processors 126-1 to 126-4, each featuring 2 inputs and two outputs shall perform the identical de-enveloping transform as those shown in the post-processor (de-enveloping) 126 in FIG. 1A. In anyone of the 4 de-enveloping processors 126-1 to 126-4, one of the two inputs is a recovered enveloped K-muxed data stream (one of ye1 to ye4) and the other input is a selected digital envelope stream from a local digital envelop folder 180. Furthermore only one of the two outputs is sent for de-aggregating via K-demuxing 140 and the other is grounded.

The 4 inputs to the K-demuxing 140; y1, y2, y3, and y4; referred to as 4 recovered K-muxed data streams which have been digitally de-enveloped by the 4 de-enveloping processor 126-1 to 126-4. These digital envelopes are from a candidate envelope folder 180. All the potential envelops are in the candidate envelope folder 180, and shall be known to both the source 112 and the destinations 122.

The K-demuxing 140 must perform a transform which is the corresponding inversed transform to that of the K-muxing 130 in FIG. 4A, featuring an orthogonal matrixes or a non-orthogonal matrixes, as long as the inverse matrixes exist. The 4 outputs from the K-demuxing 140 shall be the recovered the Pbx data stream and 3 recovered information data streams xa, xb and xc; or Sx(t), Sy(t) and Sz(t). The information data streams Sx(t), Sy(t), and Sz(t) intended for a user x in a first, a user y in a second, and a user z in a third of the 3 destinations 120, are recovered through 3 different linear combinations in 3 individual operations of K-demuxing 140 in three different destinations 120. The 4 identical potential inputs to the 3 individual operations of K-muxing 140 are [y1, y2, y3, y4].

In scenarios with known Pbx at one of 3 destinations 120, the receiver at the destination requires to capture only any 3 of the 4 satellite-relayed or satellite-transponded enveloped K-muxed information streams; ye1, ye2, ye3, ye3, and ye4. Three of the 4 de-enveloping processors 126-1 to 126-4 shall de-envelope all three of them, recovering a subset of three from the 4 K-muxed information data streams; [y1, y2, y3, y4]. Let us assume the 3-y subset is [y1, y3, y4]. According to Equations (9-1) to (9-4), the K-demuxing 140 in the first of 3 destinations 120 shall be configured for solving xa through a first unique linear combination of 3 components of the 3-y subset; [y1, y3, y4]. Similarly the K-demuxing 140 in the second and the third of the 3 destinations 120 shall be configured, respectively, for solving xb and xc individually through a second and third unique linear combinations of 3 components of the same 3-y subset; [y1, y3, y4].

Figure 4C:
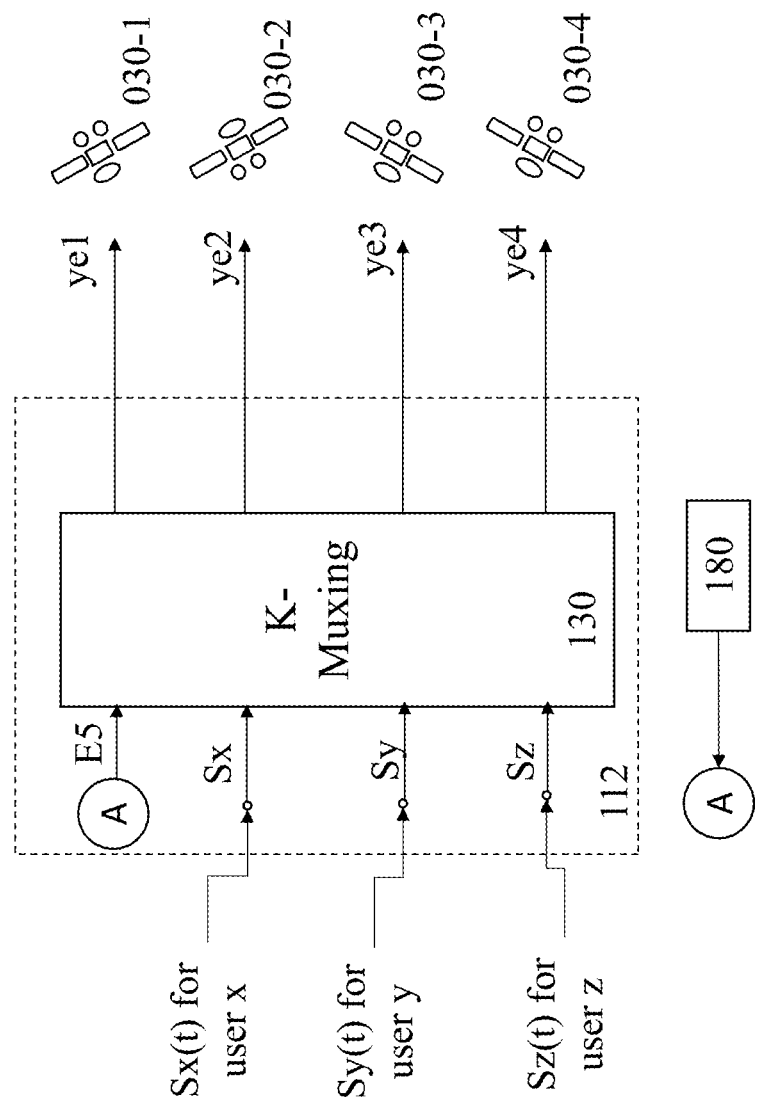
FIG. 4C illustrates a different configuration from FIG. 4A for enveloping 4 K-muxed information streams.
Figure 4D:
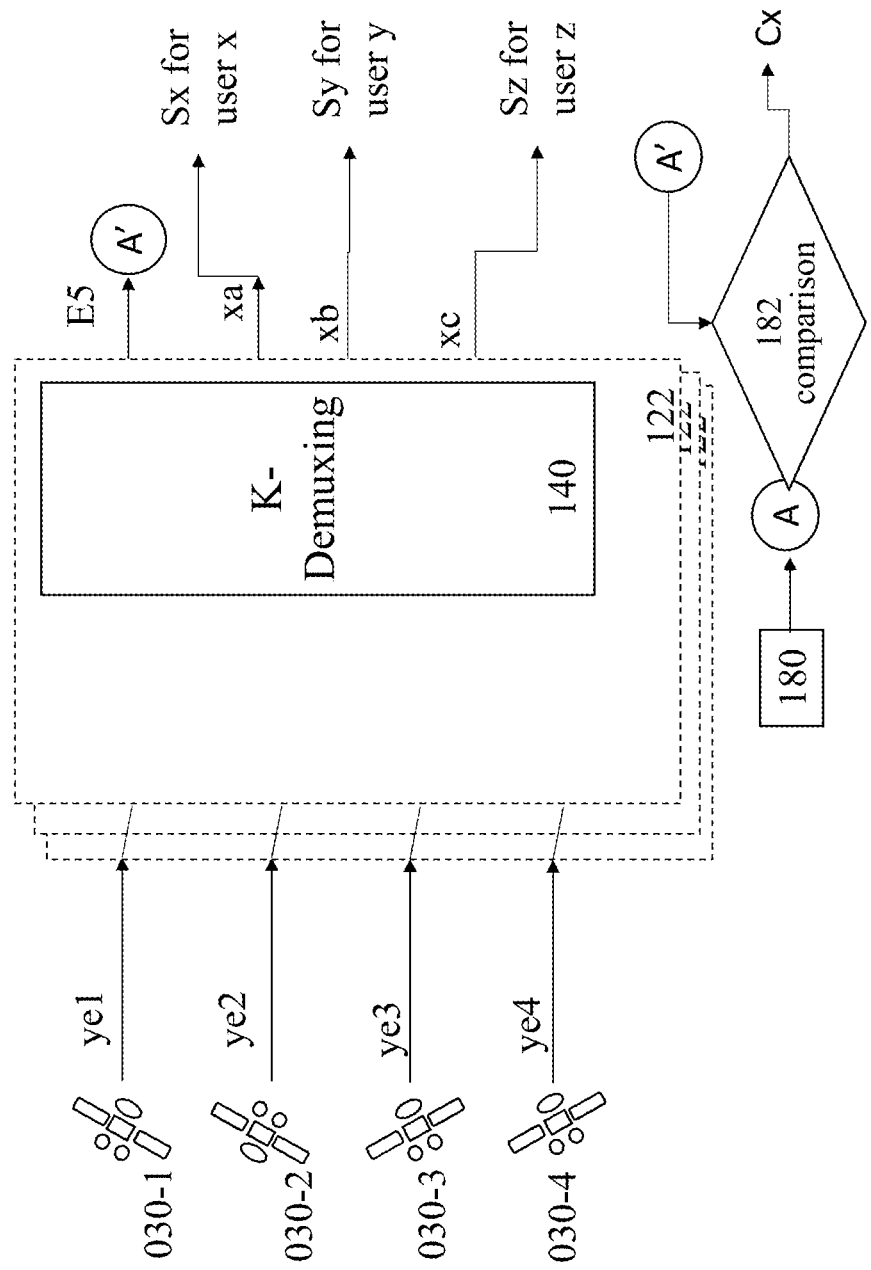
FIG. 4D illustrates a configuration complementary to the configuration in FIG. 4C for enveloping 4 K-muxed information streams.

The block diagrams in FIG. 4C and FIG. 4D are complimentary to each other in a configuration for enveloping 4 K-muxed information streams by a same formatted envelops. FIG. 4C illustrates a different configuration from FIG. 4A; both are more detailed functional blocks at the source 112 in FIG. 4. There are two major concurrent functions in a single block; the K-muxing 130. It features (1) muxing of 3 information data streams with a digital envelope stream and concurrent enveloping of 4 muxed information streams. Three information data streams Sx(t), Sy(t), and Sz(t), are to be sent to, respectively, a user x in a first, a user y in a second, and a user z in a 3 third of 3 destinations 120. A digital envelop stream Ex and the 3 information data streams are connected to the 4 inputs of a 4-to-4 K-muxing 130. The digital envelop is selected from the candidate envelop folder 180.

Let us assume a 4-to-4 Hadamard transform be the matrix for the K-muxing 130. The enveloped K-muxed files ye1, ye2, ye3 and ye4 are the 4 outputs from the K-muxing 130. To create camouflaged effects on the 4 outputted data streams for wireless transport; the original digital envelope Ex must be "heavily weighted" before the K-muxing 130 operation.

As an example, E5 features a Chinese painting of a "running horse" shown in FIG. 1, and E5($t$) in a digital picture format is selected as Ex which is connected to the first input. Referring to equation (10) which is repeated below, the 4 inputs [y1, y2, y3, y4] to a 4-to-4 Hadamard transform are y1=E5 and y2=Sx=xa, y3=Sy=xb, and y4=Sz=xc. The four outputs are [ye1, ye2, ye3, ye4]. In order to assure that the E5($t$) image of the Chinese horse painting in y1 to be more dominant features in the 4 multiplexed outputs as camouflaged, we have emphasized the pixel intensities of y1 via:

$$\begin{bmatrix} ye1 \\ ye2 \\ ye3 \\ ye4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} am^*y1 \\ y2 \\ y3 \\ y4 \end{bmatrix} \quad (10)$$

where am>1. Usually the amplification factor "am" is set to be greater than 10. It is also assumed the 4 inputs which were re-formatted into a pixel lattice have been fully equalized. As a result, the image of "running horse" painted by Xu Baihong becomes dominant among the 4 participating inputs and appears on all 4 outputs of the K-muxing 130. The 4 K-muxed data, i.e. ye1, ye1, ye3 and ye4, shall feature a same appearance of "running horse" with various intensity settings; as depicted in the 4 digital images on the second row of FIG. 2E. We have described FIG. 2E in details previously.

FIG. 4D illustrates more detailed functional blocks at one of 3 destinations 122 in FIG. 4. It is also a corresponding block diagram of data processing functions to those depicted in FIG. 4C. There are two major and separated functions in a single blocks; the function of de-enveloping and recovering a desired information data stream from multiple muxed information data streams.

Referring to equation (11) which is repeated in here. The 4 inputs to the K-demuxing 140, ye1, ye2, ye3, and ye4, will be digitally de-enveloped and de-aggregated concurrently. The K-demuxing 140 shall perform an inverse transform to a corresponding one in K-muxing 130 in FIG. 4C. The inverse matrix is also a Hadamard matrix and its transform is characterized by:

$$\begin{bmatrix} am*y1 \\ y2 \\ y3 \\ y4 \end{bmatrix} = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \begin{bmatrix} ye1 \\ ye2 \\ ye3 \\ ye4 \end{bmatrix} \quad (11)$$

where [y1, y2, y3, y4]=[E5, xa, xb, xc].

Four outputs from the K-demuxing 140 shall include a recovered digital envelop E5, and 3 recovered information data streams xa, xb, and xc. In the first of the 3 destinations 120, Sx(t) for user x is recovered via a customized first linear combination in the K-demuxing 140, $$Sx(t)=xa=y2=ye1-ye2+ye3-ye4 \quad (11-1)$$

Similarly, in the second of the 3 destinations 120, Sy(t) for user y is recovered via a customized second linear combination in the K-demuxing 140, $$Sx(t)=xb=ye1+ye2-ye3-ye4 \quad (11-2)$$

Concurrently, in the third of the 3 destinations 120, Sz(t) for user z is recovered via a customized second linear combination in the K-demuxing 140, $$Sx(t)=xc=y4=ye1-ye2-ye3+ye4 \quad (11-2)$$

An original digital envelope E5($t$) from a local envelope folder 180 in each of the three destinations 122 shall be used for a digital comparison 182 to the recovered envelop bit-by-bit for data integrity monitoring via an integrity index Cx.

In another embodiment where Ex is known at a destination, there is one redundancy in 4 received independent data streams, [ye1, ye2, ye3, ye4] for solving three unknown information data streams [xa, xb, xc]=[Sx(t), Sy(t), Sz(t)]. It can be used for better availability for communication channels between a source 112 and three destinations 122.

FIG. 2E is a replicate of FIG. 5 in US patent application publication No. 20150032706. There are 12 digital images on three panels. They are results of a simulation program implemented in Matlab. The four digital streams depicted on the top panel 521 are the 4 inputs to equation (10); y2, y3, y4, and y1 where y2=xa, y3=xb, y4=xc, and y1=E5. The 4 outputs of Equation (10) depicted on the middle panel 522 are [ye1, ye2, ye3, ye4]. As shown on their appearances, each of the 4 outputs has been digital enveloped by a common envelop E5 but with various brightness.

The 4 images on the bottom panel 523 are result of K-demuxing 140 characterized by Equation (11). The four inputs to Equation (10) are the digital streams on the middle panel 522, and corresponding 4 concurrent outputs are the digital image streams [y1, y2, y3, y4], which equal to [xa, xb, xc, E5] on the bottom panel 523.

Other Embodiments Via FIG. 4

In a different embodiment, referring back to FIG. 4C, only 3 of the 4 outputs [ye1, ye2, ye3, ye4] from a source 112 are delivered to three of the 4 satellites 030-1 to 030-4. In this embodiment with a configuration of FIG. 4C and FIG. 4D, the receiver in anyone of three destinations 120 must use the original envelop data stream Ex in order to de-envelop and to recover [xa, xb, xc] through K-demuxing 140 concurrently.

Similarly, with a configuration of FIG. 4C and FIG. 4D, the receiver in a destination 122 must have access of the digital envelop data stream E5 in order to recover [xa, xb, xc] through K-demuxing 140. Without accessing the local envelop data stream, the received 3 muxed streams together shall have insufficient information in reconstituting any of the 3 original information streams [xa, xb, xc].

In other embodiments of FIG. 4, FIG. 4A, FIG. 4B, FIG. 4C and FIG. 4D, any satellite links between a source and a destination may be replaced by airborne platform based links, a cellular links, wireless terrestrial links, and/or links via cloud.

Embodiment 5

FIG. 5 depicts a block diagram of a satellite communications concept similar to that of FIG. 2 but using a multi-link connectivity only through one satellite for concurrently delivering multiple data streams to various users. There are three user information data streams; Sx, Sy, and Sz in a source 112 being delivered via a connectivity with multiple links in a satellite 030 to three individual users; x, y, and z at three different destinations 120. The multi-link satellite communications concept through K-muxing over multiple information data streams features (1) improved privacy via digital enveloping and (2) enhanced availability via information data redundancy. The source 112 and the destinations 122 are under coverages of the relaying satellite 030. It is applicable for direct broadcasting satellites services (BSS), fixed satellite services (FSS), and mobile satellite services (MSS). The multilink communications concept is application to geostationary (GEO) satellites, and non-GEO satellites including satellites in mid-earth orbit (MEO), and in low-earth orbit (LEO). It may also be implemented for multicasting services using multiple links via terrestrial cloud, satellites and/or unmanned air vehicles (UAVs).

The block diagram in FIG. 5 shows a concept of communications via multiple links through a satellite between a sender at a source 112 and receivers at various destinations 122. There are three segments including (1) a pre-processing at a communications source or a source 110, (2) a multiple-link communications channel including the communications satellite 030, and (3) post-processing at destinations 122 downstream from the communications satellite 030. The information data sets Sx(t), Sy(t), and Sz(t) are, respectively, for users x, y, and z. Respective digital envelops are selected from a candidate envelop file 180 which stores digital envelops commonly known for a user community that both a sender in the source 112 and receivers at various destinations 122 belonged to. There are probing signals, Pbx, which will be incorporated as an input at the source 112 and recovered at various destinations 120 for continuously monitoring the "health" of the dynamic communications channels.

Preprocessing at the source 112 produces 4 enveloped K-muxed outputs ye1, ye2, ye3, and ye4, as depicted in FIG. 5. After frequency up-conversion, modulation, proper filtering, and power amplification, the 4 information streams ye1, ye2, ye3, and ye4 are multiplexed by a multiplexer 510 before sent to the satellite 030. The multiplexer 510 may feature a FDM function; such as those output multiplexers in many transponding satellites for accessing various transponders. The multiplexing may also be implemented in baseband signal processing before frequency up-converted to a RF for accessing various time slots in a broadcasting satellite transponder operated in a mode of single carrier. The multiplexer 510 may also perform proper multiplexing functions of frequency division, time division, code division, polarization diversity, and/or combinations of all above; for best utilization of communication asset on the satellite 030.

At a first of the 3 destinations 122 after low-noise amplification, filtering including demultiplexing by a de-multiplexer 520, frequency-conversion, and de-modulation, both de-enveloping and de-aggregating are implemented in a post-processor via K-demuxing to reconstitute original information data stream Sx(t) for user x and the digital envelop data stream Ex. The de-enveloping is to process 4 received enveloped information data streams from ye1, ye2, ye3, and ye4, removing the digital envelopes. The de-aggregating function performs a customized linear combination on the 4 de-enveloped information streams restoring a desired user information data stream Sx, and the probing signal Pbx.

Similarly at either a second or a third of the 3 destinations 122, a post processor will reconstitute the digital probing stream Pbx and an original information data stream Sy(t) or Sz(t), respectively.

The satellite 030 may feature multiple transponders in different frequency bands at an orbital slot, a regenerative satellite with advanced capability of on-board de-modulators and re-modulators, or combinations of both. The transponders from the satellite 030 may refer to 4 different transponders in a same physical satellite, or N transponders in a first satellite and (4-N) others in a second satellite; where N is 1, 2, or 3 for two satellites in the same orbital slot. It may also be other combinations from more than 2 satellites collocated in an orbital slot.

The propagation delays shall be equalized to lineup the data frames of information data streams. For 10 Mbps streams the timing accuracy shall be in the order of 100 nanoseconds or $10^{-7}$ seconds.

Figure 5A:
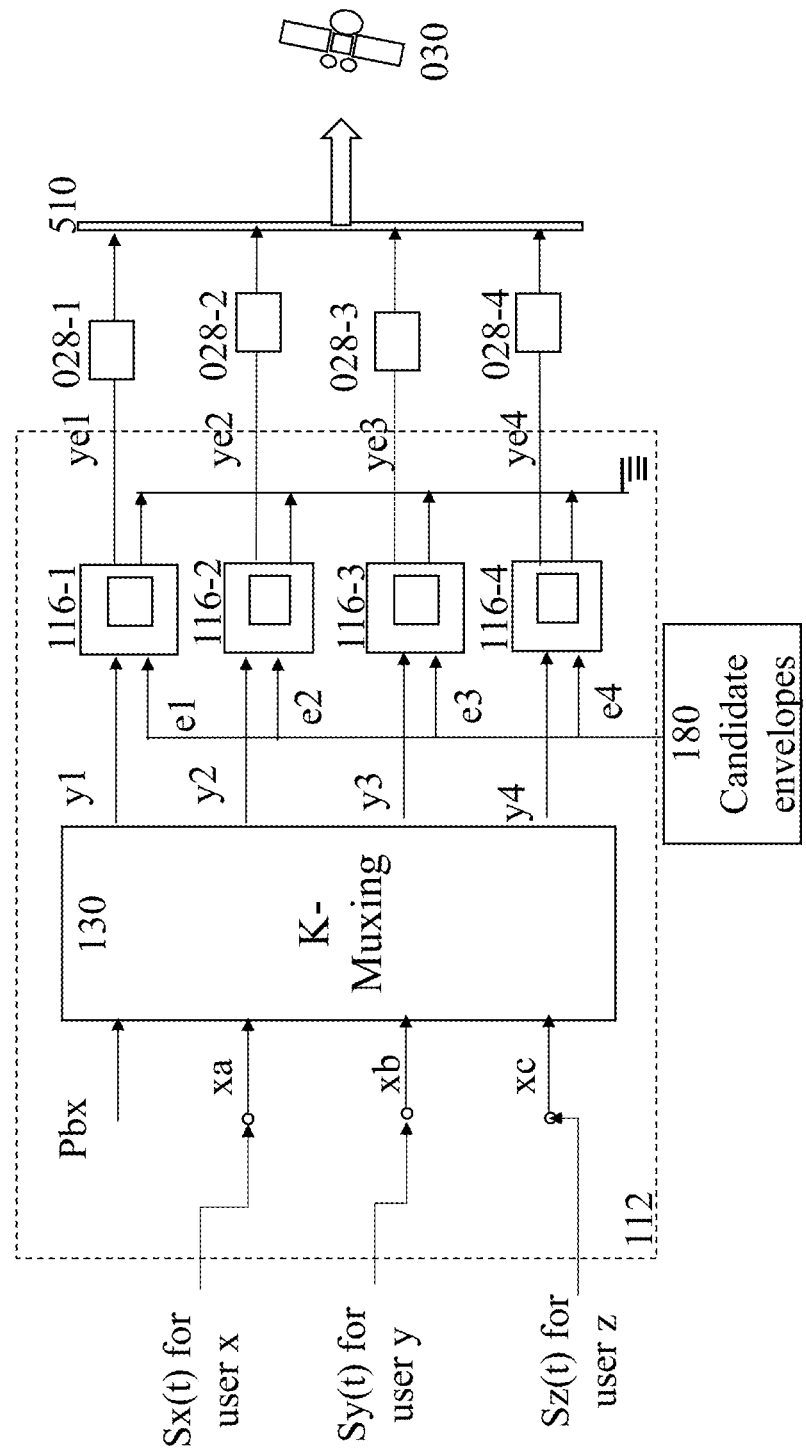
FIG. 5A depicts a block diagram on K-muxing 3 data streams into 4 K-muxed data streams, digital enveloping 4 K-muxed digital streams, and then multiplexing them via conventional muxing techniques by a sender at a source before sending the 4 digitally enveloped outputs to a destination via a satellite, according to some embodiments of this invention.
Figure 5B:
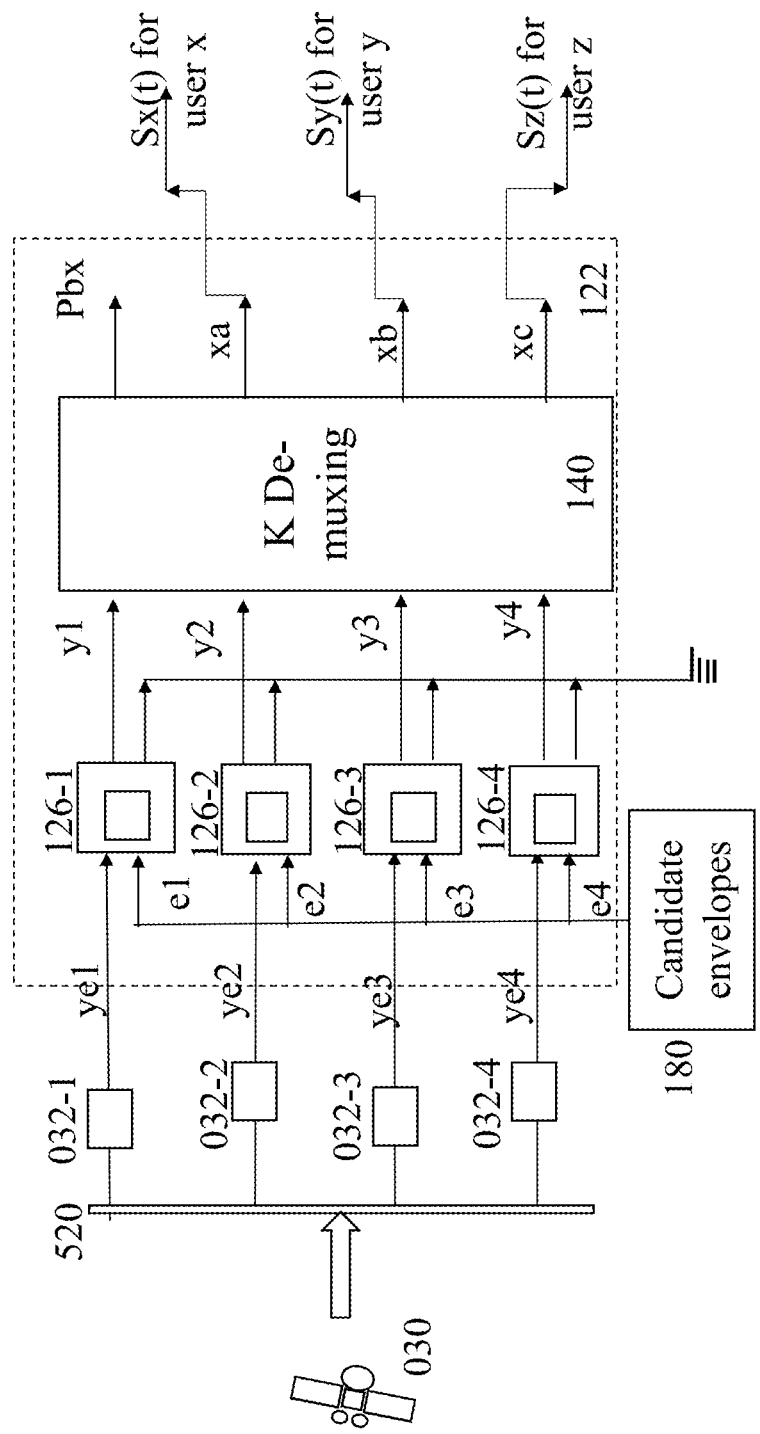
FIG. 5B depicts a block diagram on (1) receiving and demuxing the received signals, (2) de-enveloping on 4 received data streams from 4 channels from a satellite with locally available digital envelopes and then (3) reconstituting the original sub-files via a 4-to-4 K-demuxing according to embodiments of this invention.

The block diagrams in FIG. 5A and FIG. 5B are complimentary to each other. FIG. 5A illustrates more detailed functional blocks at the source 112 in FIG. 5. There are two major and separated functional blocks; the mixing functions of information data stream among 4 inputs via a 4-to-4 K-muxing 130, and those of enveloping 116-1 to 116-4. The enveloping 116-1 to 116-4 are concurrently carried out by 4 sets of 2-to-2 K-muxers with functions identical to the enveloping 116 in FIG. 1A. There are two sets of sequential K-muxing operations in FIG. 5A; the K-muxing 130 generating 4 aggregated outputs [y1, y2, y3, y4] among four information data streams, The four outputs by the K-muxing 130 are the 4 linear combinations among the inputs of four information data streams; Pbx, Sx, Sy, and Sz. Four outputs feature different aggregations and each is then followed by one of the 4 enveloping processors 116-1 to 116-4 performing a 2-to-2 K-muxing transform under a customized configuration.

The first input of the K-muxing 130 is a probing data stream, Pbx. Information data streams Sx(t), Sy(t) and Sz(t) intended for a user x in a first, a user y in a second, and a user z in a third of the 3 destinations 122 are connected to, respectively, last 3 of the 4 inputs of the K-muxing 130.

There are 4 outputs from the function of K-muxing 130; y1, y2, y3, and y4; which shall be referred to as 4 K-muxed data streams are then digitally enveloped by the 4 enveloping processor 116-1 to 116-4. The enveloped K-muxed data streams, ye1 to ye4, are then multiplexed before being sent to the 4 satellites 030-1 to 030-4 concurrently after properly modulated, frequency converted, filtered, and then power amplified.

We may set Sx(t)=xa, Sy(t)=xb, and Sz(t)=xz, and then the K-muxing 130 is characterized by the identical 4 simultaneous linear equations (8-1) to (8-4). These equations can be written in a matrix form in equation (8). When [W] is a 4×4 Hadamard matrix or any matrix with an existing inversed matrix, the 4 linear equations (8-1) to (8-4) are independent. When [Y] is known and/or available at a destination 122, all 4 unknown components in the [X], or [Pbx, xa, xb, xc] can be solved or calculated.

It is noticed that for other scenarios where the Pbx is known at a destination, the 4 simultaneous linear equations (8) can be written as equation (9-1) to (9-4). When [Y] becomes available from the satellite link and Pbx is known a priori, there are 4 simultaneous linear equations for all 3 unknown components in the [X]; or xa, xb, and xc. Therefore there is one built-in redundancy in the four components of [Y]. We only need three of the 4 components in [Y] to solve for the three unknowns; xa, xb, and xc via equations (9-1) to (9-4).

The K-muxing 130 will be via orthogonal matrixes or non-orthogonal matrixes, as long as their inverse matrixes exist.

In the 4 enveloping processors 116-1 to 116-4, each featuring 2 inputs and two outputs shall perform the identical enveloping transform as that shown in the function of enveloping 116 with two inputs and two outputs in FIG. 1A. In anyone of the 4 enveloping processors 116-1 to 116-4, one of the two inputs is a K-muxed data stream (one of y1 to y4) and the other input is a digital envelop stream selected from a candidate envelop folder 180. The selected envelops are e1, e2, e3, and e4 for the enveloping processors 116-1, 114-2, 116-3 and 116-4, respectively. Furthermore only one of its two outputs is sent for a satellite communication channel and the other is grounded.

These digital envelopes (e1, e2, e3, and e4) are from a candidate envelope folder 180. All the potential digital envelops are collected in the local candidate envelope folders 180, and shall be known to both the source 112 and the destination 122. We may choose 4 completely different digital envelops for all for 4 K-muxed information data streams; y1, y2, y3, and y4. On the other hand, we may select an identical envelop for transporting all 4 of them via individual channels in the satellites 030.

The enveloped streams ye1, ye2, ye3, and ye4 are then individually modulated by 4 modulators 028-1 to 028-4, converting the 4 information data streams into 4 signal streams or 4 waveform streams and then FDM multiplexed by the multiplexer 510 before being sent to the satellite 030. The multiplexing functions of the multiplex 510 may be implemented into other conventional formats, such as FDM, TDM, CDM, polarization diversity, and/or combinations of all above.

FIG. 5B illustrates more detailed functional blocks at one of the 3 destinations 122 in FIG. 5. It is also a corresponding block diagram of data processing functions to those depicted in FIG. 5A. There are two major and separated functional blocks; the functions of de-enveloping 126-1 to 126-4, and K-demuxing 140.

The enveloped K-muxed data streams, ye1 to ye4, are recovered from the satellite 030 after low-noise amplified, FDM demuxed by a FDM-demuxer 520, frequency converted, properly filtered, and then individually de-modulated by 4 demodulators 032-1, 032-2, 032-3, and 032-4.

In the 4 de-enveloping processors 126-1 to 126-4, each featuring 2 inputs and two outputs shall perform the identical de-enveloping transform as those shown in the function of de-enveloping 126 with two inputs and two outputs in FIG. 1A. In anyone of the 4 de-enveloping processors 126-1 to 126-4, one of the two inputs is a recovered enveloped K-muxed data stream (one of ye1 to ye4) and the other input is a selected digital envelope stream from a local digital envelop folder 180. Furthermore only one of the two outputs is sent for K-demuxing 140 and the other is grounded.

The 4 inputs to the K-demuxing 140; y1, y2, y3, and y4; referred to as 4 recovered K-muxed data streams which have been digitally de-enveloped by the 4 de-enveloping processor 126-1 to 126-4. These digital envelopes are from a candidate envelope folder 180. All the potential envelops are in the candidate envelope folder 180, and shall be known a priori to both the source 112 and the destinations 122.

The K-demuxing 140 must perform a corresponding transform which is an inversed transform to that of the K-muxing 130 in FIG. 5A, featuring either an orthogonal matrix or a non-orthogonal matrix, as long as their inverse matrixes exist.

The 4 outputs from a K-demuxing 140 shall be the recovered the Pbx data stream and 3 recovered information data streams xa, xb and xc; or Sx(t), Sy(t) and Sz(t). The information data streams Sx(t), Sy(t), and Sz(t) intended for user x in a first, user y in a second, and user z in a third of the 3 destinations 122, are recovered through 3 different linear combinations in 3 individual operations of K-demuxing 140 in three different destinations 120. The 4 identical potential inputs to the 3 individual operations of K-muxing 140 are [y1, y2, and y3, and y4].

In scenarios with known Pbx at one of 3 destinations 120, the receiver at the destination requires to capture only any 3 of the 4 satellite-relayed or satellite-transponded enveloped K-muxed information streams; ye1, ye2, ye3, and ye4. Three of the 4 de-enveloping processors 126-1 to 126-4 shall de-envelope all three of them, recovering a subset of three from the 4 K-muxed information data streams; [y1, y2, y3, y4]. Let us assume the 3-y subset is [y1, y3, y4]. According to Equations (9-1) to (9-4), the K-demuxing 140 in the first of 3 destinations 120 shall be configured for solving xa through a first unique linear combination of 3 components of the 3-y subset; [y1, y3, y4]. Similarly the K-demuxing 140 in the second and the third of the 3 destinations 120 shall be configured, respectively, for solving xb and xc individually through a second and third unique linear combinations of 3 components of the same 3-y subset; [y1, y3, y4].

In other embodiments, the two cascaded K-muxing functions of data aggregating (or mixing) and enveloping in FIG. 5A can be implemented by one-K-muxing concurrently similar to the block diagram in FIG. 4C. Similarly, the two cascaded K-demuxing functions of data de-aggregating (or mixing) and de-enveloping in FIG. 5B may be implemented by one-K-demuxing concurrently similar to the block diagram in FIG. 4D.

ADDITIONAL COMMENTS

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. A communications system between a source and a destination comprising a transmitter at the source and a communication connectivity, the transmitter comprising:
    a preprocessor having multiple input and output ports and configured to perform a wavefront multiplexing (WFM) transform from multiple inputs at the multiple input ports to multiple outputs at the multiple output ports for enveloping; and
    a candidate envelope folder configured to provide a digital envelope for the WFM transform;
    wherein the WFM transform calculates a linear combination of the multiple inputs including the digital envelope such that a first output of the multiple outputs is substantially identical to the digital envelope, and
    wherein the digital envelope is a known data file.

2. The communications system of claim 1 wherein the multiple inputs include a first input stream for an embedded digital information data file, and a second input stream for the digital envelope.

3. The communications system of claim 2 wherein the first output includes an enveloped data stream which is a weighted sum of the first and the second input streams.

4. The communications system of claim 1 wherein the WFM transform includes a magnification factor.

5. The communications system of claim 4 wherein the digital envelope is known by a user at the destination.

6. The communications system of claim 1 wherein the communication connectivity includes a satellite link.

7. The communications system of claim 1 wherein the communication connectivity includes links transponded by air platforms.

8. The communications system of claim 1 wherein the communication connectivity includes terrestrial links through IP cloud.

9. The communications system of claim 1 wherein the WFM transform is performed using an orthogonal matrix.

10. The communications system of claim 1 wherein the WFM transform is performed using a Hadamard matrix.

11. The communications system of claim 1 comprising an orthogonal matrix.

12. The communications system of claim 11 comprising Hadamard matrices.

13. A communications system between a source and a destination comprising a receiver in the destination and a communication connectivity, the receiver comprising:
    a post-processor having multiple input and output ports and configured to perform a wavefront demultiplexing (WFD) transform from multiple inputs at the multiple input ports to multiple outputs at the multiple output ports for de-enveloping, the multiple inputs including an enveloped data stream of an original input stream; and
    a candidate envelope folder configured to provide a digital envelope for the WFD transform;
    wherein the WFD transform calculates a linear combination of the multiple inputs including the digital envelope such that a first output of the multiple outputs is substantially identical to the original input stream.

14. The communications system of claim 13 wherein the multiple inputs include a first input stream for the enveloped data stream, and a second input stream for the digital envelope.

15. The communications system of claim 14 wherein the first output is a weighted sum of the first and the second input streams.

16. The communications system of claim 14 wherein the WFD transform includes a magnification factor.

17. The communications system of claim 14 wherein a second output of the multiple outputs is grounded.

18. The communications system of claim 13 wherein the multiple inputs include two received streams from two relay links.

19. The communications system of claim 13 wherein the WFD transform includes a Hadamard matrix.

20. The communications system of claim 13 wherein the communication connectivity includes a satellite link.

\* \* \* \* \*